(12) United States Patent
Iwasawa et al.

(10) Patent No.: US 8,391,711 B2
(45) Date of Patent: Mar. 5, 2013

(54) OPTICAL RELAY SYSTEM AND NETWORK CONTROL DEVICE

(75) Inventors: Takuya Iwasawa, Kawasaki (JP); Kenta Noda, Yokohama (JP); Takayuki Suzuki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 84 days.

(21) Appl. No.: 13/153,785

(22) Filed: Jun. 6, 2011

(65) Prior Publication Data

US 2012/0002963 A1 Jan. 5, 2012

(30) Foreign Application Priority Data

Jun. 8, 2010 (JP) ................................. 2010-130893

(51) Int. Cl.
*H04J 14/00* (2006.01)
(52) U.S. Cl. ............................... 398/62; 398/45; 398/64
(58) Field of Classification Search .............. 398/45–57, 398/62–64
See application file for complete search history.

(56) References Cited

U.S. PATENT DOCUMENTS

| 7,877,011 B2* | 1/2011 | Fukashiro | 398/56 |
| 2003/0016411 A1 | 1/2003 | Zhou et al. | |
| 2004/0086224 A1 | 5/2004 | Elbers et al. | |
| 2004/0120711 A1 | 6/2004 | Elbers et al. | |
| 2006/0203329 A1* | 9/2006 | Nishihara et al. | 359/337 |
| 2006/0245755 A1* | 11/2006 | Gumaste et al. | 398/59 |
| 2009/0142057 A1 | 6/2009 | Nakano | |
| 2009/0297143 A1* | 12/2009 | Takeyama et al. | 398/34 |
| 2009/0297149 A1* | 12/2009 | Nakazato et al. | 398/79 |

FOREIGN PATENT DOCUMENTS

| JP | 2003-249903 | 9/2003 |
| JP | 2009-147913 A | 7/2009 |
| JP | 2010-103781 A | 5/2010 |
| WO | WO 02/075970 A2 | 9/2002 |
| WO | WO 02/075971 A2 | 9/2002 |

OTHER PUBLICATIONS

European Patent Office extended search report on application No. 11169000.4 mailed Oct. 14, 2011; 8 pages.
Japan Patent Office action on application 2010-130893 mailed Jul. 31, 2012; pp. 1-2.

* cited by examiner

*Primary Examiner* — Dzung Tran
(74) *Attorney, Agent, or Firm* — Foley & Lardner LLP

(57) ABSTRACT

Provided is an optical relay system (10) which is capable of suppressing wasteful power consumption of an entire system to a low level. The optical relay system (10) includes a plurality of relay devices (30) and a network control device (20). The network control device (20) causes an optical signal to be regenerated by a regenerative repeater (35) within the relay device (30) existing at an upstream of the relay device (30) reporting that the optical signal has deteriorated by a degree exceeding a predetermined level. Further, the network control device (20) causes the regenerative repeater (35) to stop regenerating the signal in a case where deterioration of the signal remains within an allowable range even when the regenerative repeater (35) stops regenerating the signal.

9 Claims, 18 Drawing Sheets

EQUIPMENT INFORMATION RETAINING SECTION 28

| RELAY DEVICE ID | REGENERATIVE REPEATER ID | USE INFORMATION | SIGNAL ID |
|---|---|---|---|
| 30A | 35a | UNUSED | — |
| 30B | 35b | IN USE | S001 |
| 30C | 35c | IN USE | S003 |
| 30D | 35d | IN USE | S005 |
| 30E | 35e | IN USE | S004 |
| 30F | 35f | IN USE | S002 |
| 30G | 35g | UNUSED | — |
| 30H | 35h | UNUSED | — |
| 30I | 35i | UNUSED | — |
| 30J | 35j | UNUSED | — |

FIG. 5

PATH INFORMATION RETAINING SECTION 24

| SIGNAL ID (240) | RELAY DEVICE ID (241) | DETERIORATION DEGREE (242) |
|---|---|---|
| S001 | 30A | 12.1 |
|      | 30F | 33.8 |
|      | 30B | 49.9 |
|      | 30C | 15.8 |
|      | 13B | 37.1 |
| S002 | 30A | 14.7 |
|      | 30F | 49.8 |
|      | 30B | 17.1 |
|      | 30C | 50.3 |
|      | 13B | 69.5 |
| S003 | 30A | 8.1 |
|      | 30F | 20.5 |
|      | 30B | 60.3 |
|      | 30C | 81.2 |
|      | 13B | 15.2 |
| S004 | 30D | 15.6 |
|      | 30E | 33.2 |
|      | 30F | 16.9 |
|      | 30G | 48.3 |
|      | 13B | 68.4 |
| S005 | 30D | 15.8 |
|      | 30E | 14.7 |
|      | 30F | 39.8 |
|      | 30G | 60.5 |
|      | 13B | 84.1 |

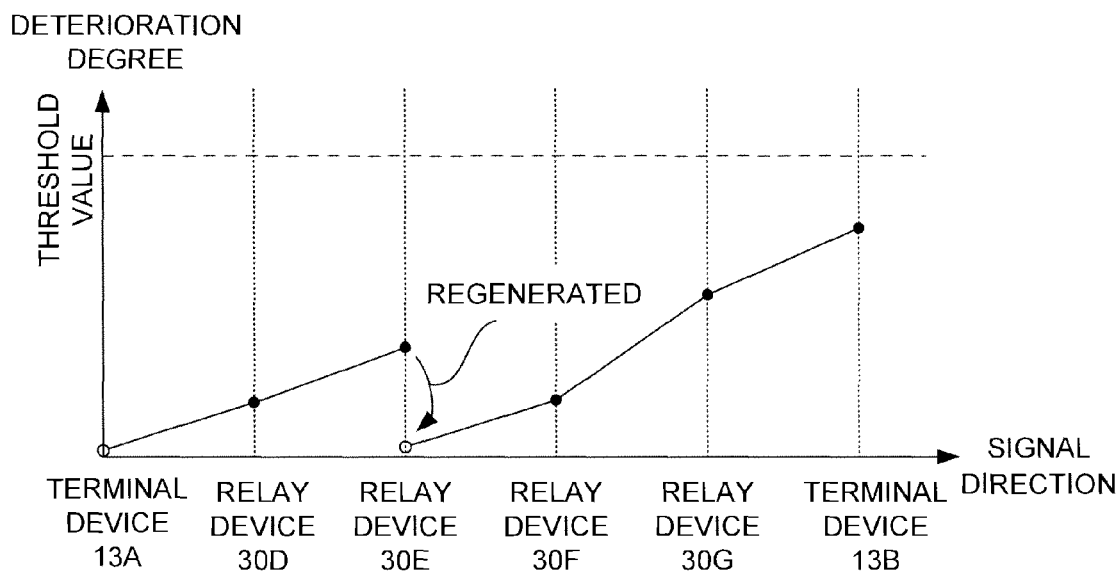

REPLACEMENT INFORMATION 270

| SIGNAL ID | IN-USE DEVICE ID | REPLACEMENT DEVICE ID |
|---|---|---|
| S002 | 30F | 30G, 30H |
| S004 | 30E | 30G |
| S005 | 30D | 30G |

LIST 40

REGENERATION STOPPING PROCESSING (S310)

OPTICAL RELAY SYSTEM AND NETWORK CONTROL DEVICE

CROSS-REFERENCE TO RELATED APPLICATION

The present application claims priority from Japanese application JP 2010-130893 filed on (Jun. 8, 2010), the content of which is hereby incorporated by reference into this application.

BACKGROUND OF THE INVENTION

The present application relates to an optical relay system which relays an optical signal by wavelength division multiplexing.

An optical add/drop multiplexer (OADM) which adds/drops a partial wavelength of a plurality of wavelengths that are multiplexed is introduced into a node device within an optical network which uses wavelength division multiplexing (WDM). Further, in recent years, introduction of a wavelength selective switch (WSS) is underway as a device capable of switching a path of an optical signal having an arbitrary wavelength. By building a network using the wavelength selective switch, it is possible to easily change the path of the optical signal even in the network configured only by the optical signal.

However, compared with a network which relays an optical signal by converting the optical signal into an electrical signal, the optical network which relays the optical signal as it is raises a problem that deterioration of the optical signal accumulates. Therefore, in a case of performing a long-distance transmission of the optical signal, it is necessary to perform signal regeneration by using a relay device to temporarily convert the optical signal into the electrical signal. Japanese Patent Application Laid-open No. 2009-147913 (hereinafter, referred to as "Patent Document 1") discloses a wavelength selective switch incorporating a regenerative repeater which performs signal regeneration by converting an optical signal into an electrical signal.

SUMMARY OF THE INVENTION

However, according to the technology disclosed in Patent Document 1, when the path of the optical signal is changed from an initial stage in which an optical network is built, there may be a case where there is a change in a distance by which the optical signal is transmitted without the intermediation of the regenerative repeater, which causes quality of the optical signal to deteriorate, and hence the received signal cannot be decoded. It cannot be decided where to locate the regenerative repeater in the new path without examining deterioration degrees of signal quality within respective relay devices.

Therefore, even when the wavelength selective switch is used to rapidly switch a relay path of the optical signal, there is no guarantee that the optical signal is appropriately transmitted in the path after the change until completion of the examination of the deterioration degrees of the signal quality within the respective relay devices, and hence it is impossible to gain an advantage that the wavelength selective switch facilitates path switching.

Further, there is an idea of constantly regenerating the optical signal by using all the relay devices all of which are provided with regenerative repeaters in order to handle all kinds of path change, but the regeneration may be performed even in a situation in which the regeneration is unnecessary, which leads to wasteful power consumption of the regenerative repeater. In addition, a plurality of optical signals having multiplexed wavelengths pass through each of the relay devices, and hence the wasteful power consumption increases when the regenerative repeaters for all the wavelengths are constantly operated on all the relay devices.

The present invention has been made in view of the above-mentioned circumstances, and an object of the present invention is to suppress wasteful power consumption of an entire optical relay system to a low level by operating a regenerative repeater when an optical signal needs to be regenerated.

In order to achieve the above-mentioned object, according to the present invention, an optical signal is regenerated by a regenerative repeater within a relay device at an upstream of a relay device reporting that the optical signal has deteriorated by a value equal to or higher than a predefined threshold value.

For example, the present invention provides an optical relay system, which relays an optical signal by wavelength division multiplexing, including:

a plurality of relay devices each of which relays the optical signal; and a network control device which controls each of the plurality of relay devices, each of the plurality of relay devices including:
  a wavelength selective switch;
  a deterioration degree measuring section which measures a deterioration degree of the optical signal having each wavelength and notifies the network control device of the measured deterioration degree along with a signal ID which identifies the corresponding optical signal and a relay device ID which identifies the own relay device; and
  a regenerative repeater which regenerates the optical signal corresponding to the signal ID when a regeneration instruction including the signal ID is received from the network control device, the network control device including:
  an equipment information retaining section which retains, for each of relay device IDs, a regenerative repeater ID which identifies the regenerative repeater included in the relay device corresponding to the each of the relay device IDs and use information which indicates whether or not the regenerative repeater is in use;
  a relay path retaining section which retains, for each of signal IDs, information which identifies an order in which the optical signal is relayed by a plurality of the relay devices existing on a relay path of the optical signal corresponding to the each of the signal IDs and the relay device IDs of the plurality of the relay devices existing on the relay path of the optical signal;
  a threshold value retaining section which retains a threshold value of the deterioration degree which is allowed for the optical signal having the each wavelength;
  a deterioration degree retaining section which retains, for each of the signal IDs, the deterioration degree notified with regard to the optical signal corresponding to the each of the signal IDs, in association with the relay device ID of the relay device that has notified the deterioration degree;
  a deterioration degree collecting section which stores the deterioration degree notified from each of the plurality of relay devices in the deterioration degree retaining section in association with the signal ID and the relay device ID which have been notified along with the deterioration degree; and a regenerative repeater allocation management section which executes a regenerative repeater allocation processing for each of the signal IDs, in which the regenerative repeater allocation management section is configured to, in the regenerative repeater allocation processing:

reference the deterioration degree retaining section and the threshold value retaining section, for each of the signal IDs, to extract the relay device ID associated with the deterioration degree equal to or higher than the threshold value from the deterioration degree retaining section when the relay device that has notified the deterioration degree equal to or higher than the threshold value exists;

identify the relay device IDs of the relay devices existing upstream of the relay device having the extracted relay device ID on the relay path of the optical signal corresponding to the each of the signal IDs from within the relay path retaining section;

select the relay device ID of the relay device including an unused regenerative repeater among the identified relay device IDs from within the equipment information retaining section; and transmit, to the relay device corresponding to the selected relay device ID, the regeneration instruction including the signal ID of the optical signal having the deterioration degree notified as being equal to or higher than the threshold value.

According to the present application, by operating the regenerative repeater when the optical signal needs to be regenerated, it is possible to suppress wasteful power consumption of the entire optical relay system to a low level.

BRIEF DESCRIPTION OF THE DRAWINGS

In the accompanying drawings:

FIG. 5 is a diagram illustrating an example of a structure of data stored in a path information retaining section;

FIG. 6 is a conceptual diagram illustrating a distribution of deterioration degrees across a relay path of an optical signal whose signal ID is "S004";

FIG. 7 is a diagram illustrating an example of a structure of data stored in a priority retaining section;

DESCRIPTION OF THE PREFERRED EMBODIMENT

Hereinafter, an embodiment of the present invention is described with reference to the accompanying drawings.

Figure 1:
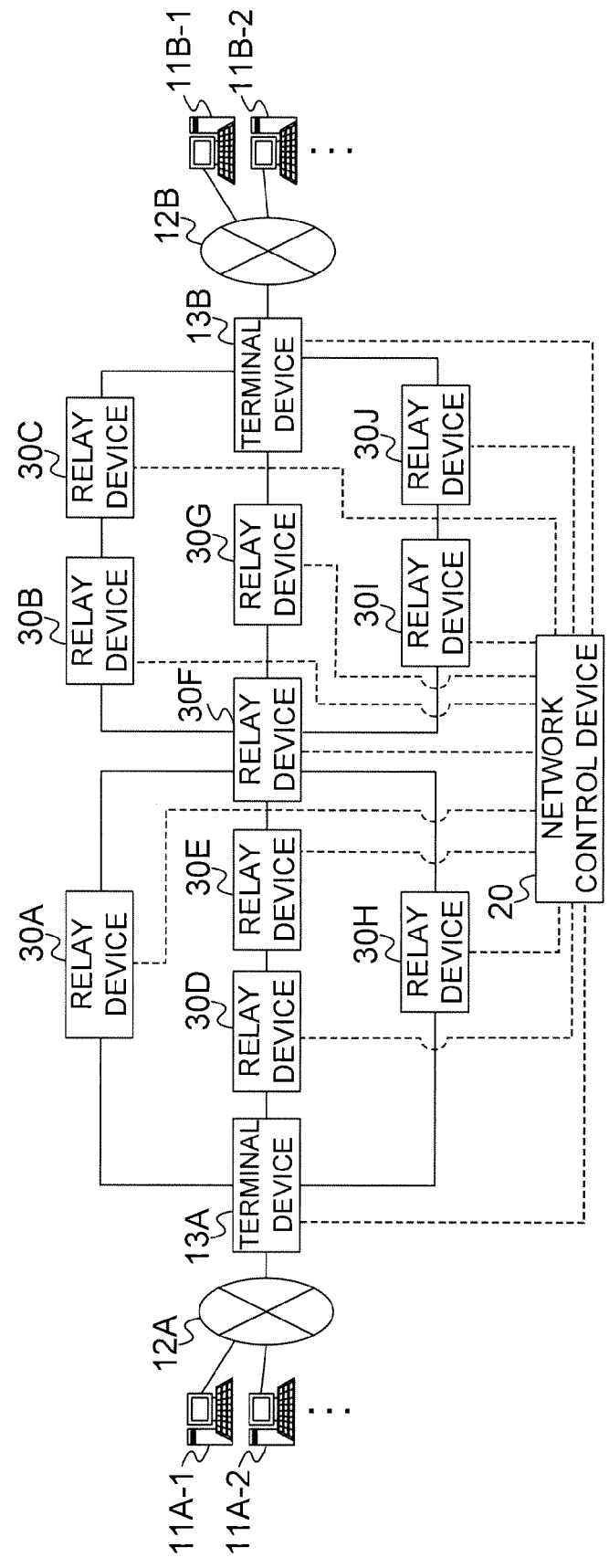
FIG. 1 is a system configuration diagram illustrating a configuration of an optical relay system according to an embodiment of the present invention.

FIG. 1 is a system configuration diagram illustrating a configuration of an optical relay system 10 according to the embodiment of the present invention. The optical relay system 10 includes a plurality of terminal devices 13, a plurality of relay devices 30, and a network control device 20 which controls the respective relay devices 30.

The respective terminal devices 13 are, for example, connected to a plurality of communication devices 11 via access lines 12 such as metal cables. Further, the plurality of relay devices 30 are provided between the terminal devices 13, and optical fiber cables are used for connections between the terminal device 13 and the relay device 30 and between the relay device 30 and the relay device 30. Further, the respective terminal devices 13 and the respective relay devices 30 communicate with the network control device 20 via a management network (indicated by the dotted lines of FIG. 1) such as metal cables.

Each of the relay devices 30, which includes a wavelength selective switch (WSS), receives an optical signal obtained by multiplexing optical signals having a plurality of wavelengths via the optical fiber cable, and separates the received optical signal into the optical signals having the respective wavelengths. Then, according to an instruction issued from the network control device 20, the relay device 30 again multiplexes the optical signals having the respective wavelengths for each of the other relay devices 30 or each of the terminal devices 13 that is a transmission destination, and sends out the multiplexed optical signal to another of the relay devices 30 or the terminal device 13.

Further, each of the terminal devices 13 and the relay devices 30 measures a deterioration degree of the optical signal having each wavelength received from another terminal device 13 or another relay device 30, and notifies the network control device 20 of the measured deterioration degree via the management network. Further, when a regeneration instruction that specifies the optical signal having a specific wavelength is received from the network control device 20 via the management network, in relaying the optical signal having each wavelength received from another terminal device 13 or another relay device 30, each of the relay devices 30 regenerates and sends out the optical signal having the wavelength specified by the regeneration instruction from among the optical signals having the respective wavelengths.

When the network control device 20 is notified of the deterioration degrees of the optical signals having the respective wavelengths from each of the terminal devices 13 and the relay devices 30 via the management network, with regard to the optical signal whose deterioration degree is equal to or higher than a predetermined level, the network control device 20 transmits the regeneration instruction that specifies the above-mentioned optical signal to any one of the relay devices 30 located on a relay path of the above-mentioned optical signal.

Figure 2:
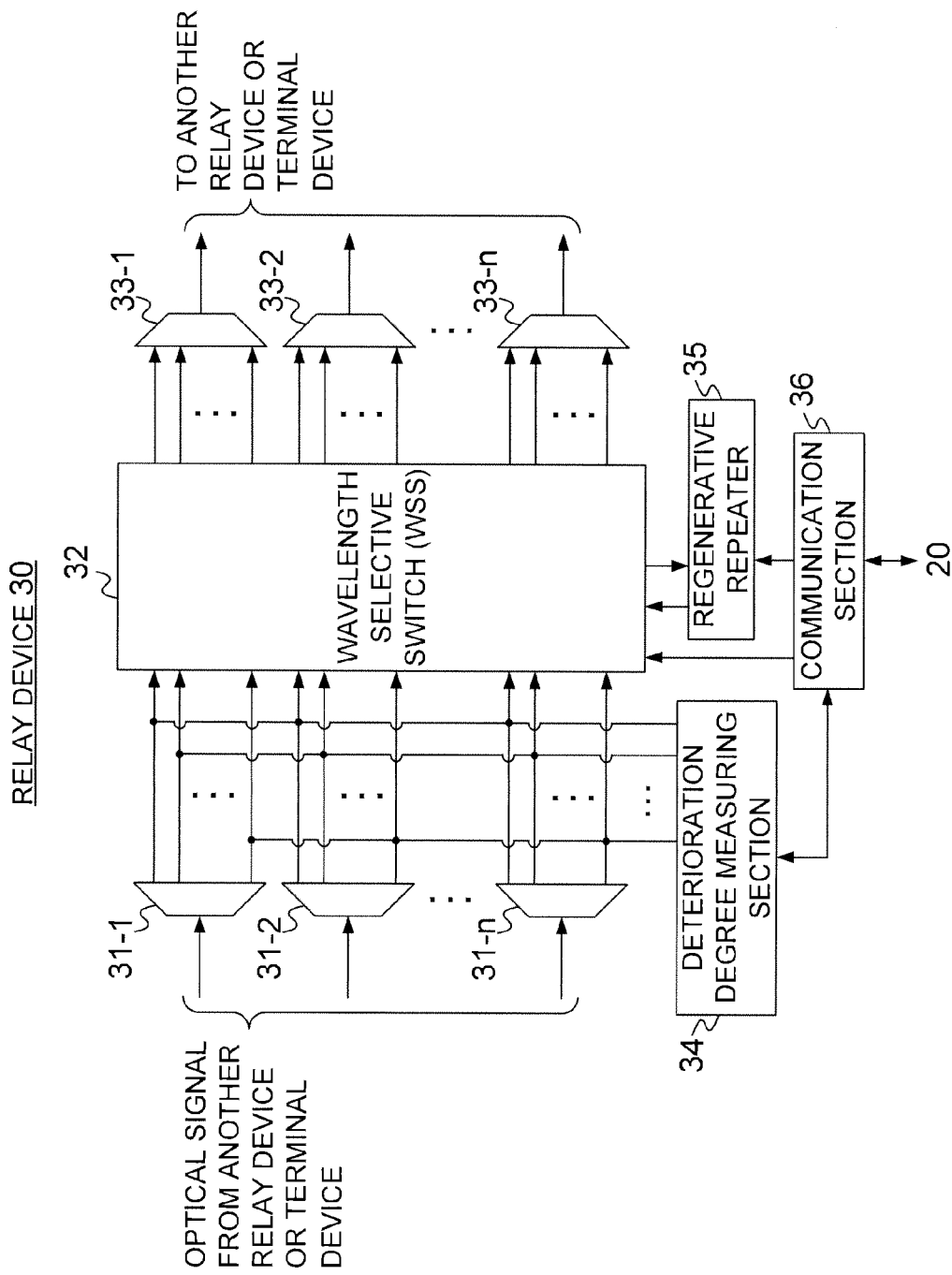
FIG. 2 is a block diagram illustrating an example of a functional configuration of a relay device.

FIG. 2 is a block diagram illustrating an example of a functional configuration of the relay device 30. The relay device 30 includes a plurality of demultiplexers 31, a wavelength selective switch (WSS) 32, a plurality of multiplexers 33, a deterioration degree measuring section 34, a regenerative repeater 35, and a communication section 36.

Each of the demultiplexers 31, which is provided for each of the terminal device 13 of a relay source and the other relay devices 30 to which the own relay device 30 is connected via the optical fiber cables, separates the optical signal received from the terminal device 13 or another relay device 30 into the optical signals having the respective wavelengths, and sends the optical signals to the WSS 32.

The WSS 32 sends the optical signal having each wavelength received from each of the demultiplexers 31 to any one of the multiplexers 33 according to an instruction received from the network control device 20 via the communication section 36. Further, when the optical signal is being regenerated by the regenerative repeater 35, the WSS 32 sends the optical signal regenerated by the regenerative repeater 35 to the multiplexer 33 in place of the optical signal before regeneration thereof.

Each of the multiplexers 33, which is provided for each of the terminal device 13 of a relay destination and the other relay devices 30 to which the own relay device 30 is connected via the optical fiber cables, multiplexes the optical signals having the respective wavelengths output from the WSS 32, and sends out the multiplexed optical signal to the terminal device 13 of the relay destination or another relay device 30.

The deterioration degree measuring section 34 measures the deterioration degree of the optical signal having each wavelength obtained by separation by the demultiplexer 31 at regular timings, for example, every hour or at a timing at which a quality measuring instruction is received from the network control device 20 via the communication section 36. Then, the deterioration degree measuring section 34 sends quality information to the network control device 20 via the communication section 36, the quality information including the measured deterioration degree, a signal ID which identifies the optical signal to be subjected to the measurement, and a relay device ID which identifies the own relay device 30.

In this embodiment, the term "deterioration degree" represents a numerical value indicating a degree of deterioration in quality of the optical signal and assuming a higher numerical value for the optical signal having worse quality. In this embodiment, the deterioration degree is, for example, the reciprocal of a signal-to-noise ratio (SNR).

The regenerative repeater 35 extracts the optical signal having a wavelength corresponding to a signal ID from the WSS 32 when the regeneration instruction including the signal ID is received from the network control device 20 via the communication section 36, regenerates the optical signal, and returns the regenerated optical signal to the WSS 32. Further, when a regeneration stopping instruction including a signal ID is received from the network control device 20 via the communication section 36, the regenerative repeater 35 stops the regeneration being executed for the optical signal corresponding to the signal ID.

The communication section 36 communicates with the network control device 20 via the management network, and sends the regeneration instruction and the regeneration stopping instruction, which are received from the network control device 20 via the management network, to the regenerative repeater 35. Further, the communication section 36 sends the quality measuring instruction, which is received from the network control device 20 via the management network, to the deterioration degree measuring section 34, and transmits the quality information, which is received from the deterioration degree measuring section 34, to the network control device 20 via the management network.

Figures 3, 4:
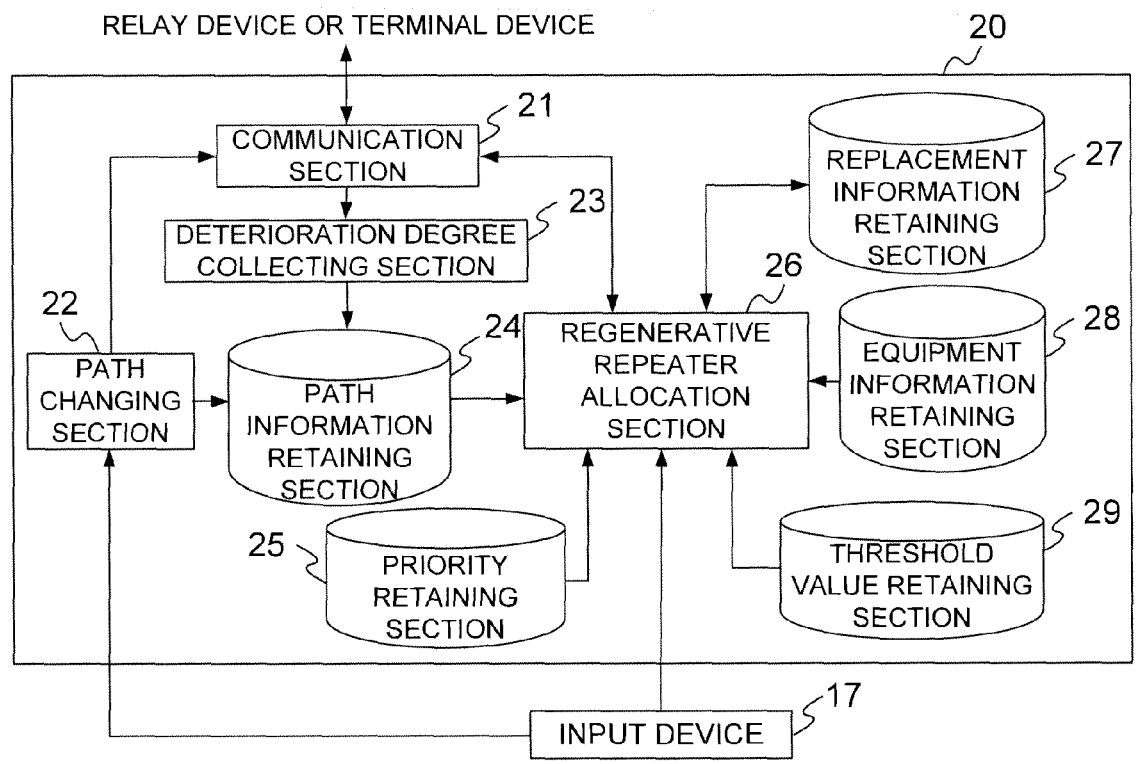
FIG. 3 is a block diagram illustrating an example of a functional configuration of a network control device.
FIG. 4 is a diagram illustrating an example of a structure of data stored in an equipment information retaining section.

FIG. 3 is a block diagram illustrating an example of a functional configuration of the network control device 20. The network control device 20 includes a communication section 21, a path changing section 22, a deterioration degree collecting section 23, a path information retaining section 24, a priority retaining section 25, a regenerative repeater allocation section 26, a replacement information retaining section 27, an equipment information retaining section 28, and a threshold value retaining section 29. The communication section 21 communicates with the terminal device 13 and the relay device 30 via the management network.

The equipment information retaining section 28 retains, as illustrated in, for example, FIG. 4, in association with a relay device ID 280 which identifies each of the relay devices 30, a regenerative repeater ID 281 which identifies the regenerative repeater 35 included in the relay device 30, use information 282 which indicates whether or not the regenerative repeater 35 is in use, and a signal ID 283 which identifies the optical signal having a wavelength being regenerated by the regenerative repeater 35 in a case where the regenerative repeater 35 is in use. The relay device ID 280 and the regenerative repeater ID 281 are registered in advance in a stage in which each of the relay devices 30 is installed. The use information 282 stores "unused" as a default value.

The threshold value retaining section 29 retains a threshold value of the deterioration degree which is allowed for each optical signal having each wavelength. In this embodiment, the threshold value retaining section 29 retains one threshold value. It should be noted that, as another mode, in a case where the deterioration degree that is allowed for the optical signal having each wavelength differs according to the wavelength, in a case where the relay devices 30 and the terminal devices 13 have different capabilities to decode the optical signal, or other such cases, different threshold values may be provided according to the wavelength, the relay device 30, or the terminal device 13.

The path information retaining section 24 retains, as illustrated in, for example, FIG. 5, in association with a signal ID 240 which identifies the optical signals having each wavelength, a relay device ID 241 of the relay device 30 which relays the optical signal. Further, in association with the signal ID 240 and the relay device ID 241, the path information retaining section 24 retains a deterioration degree 242 of the optical signal corresponding to the signal ID 240, which has been notified from the relay device having the relay device ID 241.

In this embodiment, the relay device IDs of the relay devices 30 which relay the corresponding optical signal are stored in the relay device ID 241 in an order in which the corresponding optical signal is relayed. The information on the signal ID 240 and the relay device ID 241 is set when the relay path of each optical signal is decided by an administrator of the optical relay system 10.

FIG. 6 is a conceptual diagram illustrating a distribution of the deterioration degrees 242 across the relay path of the optical signal of which the signal ID 240 is "S004" in the information within the path information retaining section 24 exemplified in FIG. 5. In FIG. 6, the black circle indicates a value of the deterioration degree notified from each of the terminal devices 13 and the relay devices 30. The optical signal of which the signal ID 240 is "S004" is relayed to a relay device 30E via a relay device 30D after being output from a terminal device 13A, regenerated by a regenerative repeater 35e within the relay device 30E, and further relayed to a terminal device 13B via a relay device 30F and a relay device 30G.

The priority retaining section 25 retains, as illustrated in, for example, FIG. 7, in association with a signal ID 250 which identifies the optical signal having each wavelength, a priority 251 of the optical signal. The information within the priority retaining section 25 is set in advance by the administrator of the optical relay system 10.

Figure 8:
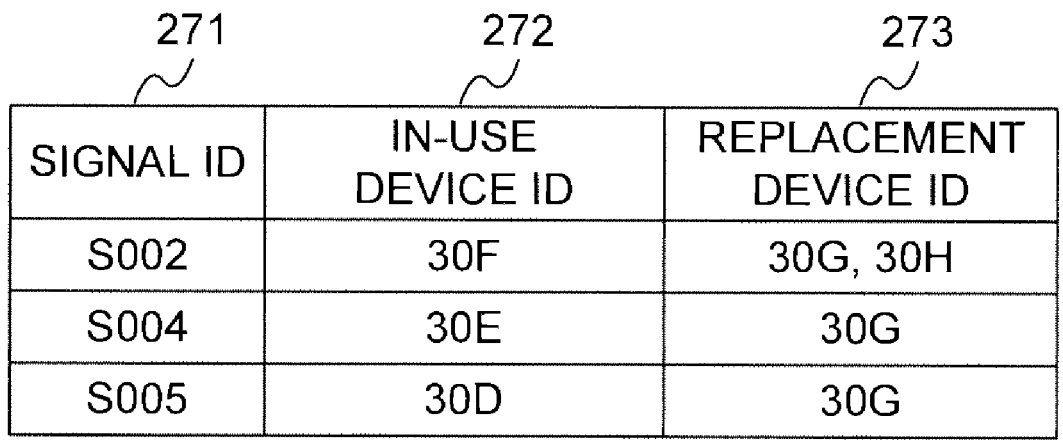
FIG. 8 is a diagram illustrating an example of a structure of data stored in a replacement information retaining section.

The replacement information retaining section 27 retains replacement information 270 as illustrated in, for example, FIG. 8. Stored in the replacement information 270, in association with a signal ID 271 which identifies the optical signal having each wavelength, are an in-use device ID 272 which indicates the relay device ID of the relay device 30 including the regenerative repeater 35 that is regenerating the optical signal and a replacement device ID 273 which indicates the relay device ID of the relay device 30 including another regenerative repeater 35 that can replace the regenerative repeater 35 in regenerating the optical signal.

Figure 9:
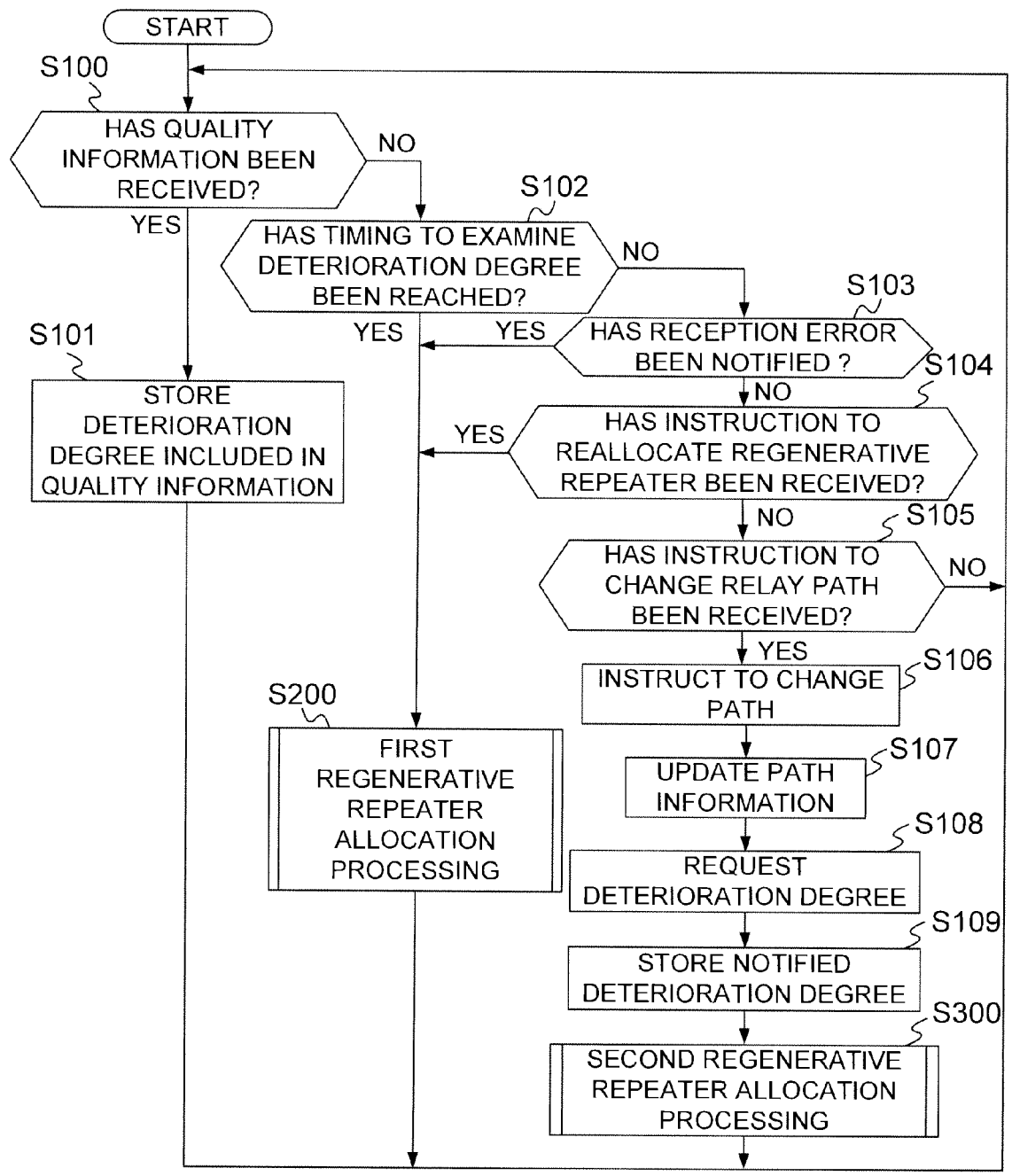
FIG. 9 is a flowchart illustrating an example of an operation of the network control device.

Next, FIG. 9 and the subsequent figures are referenced to describe operations of the other functional blocks of the network control device 20. FIG. 9 is a flowchart illustrating an example of an operation of the network control device 20. The network control device 20 starts the operation illustrated in this flowchart at a predetermined timing, for example, when power is turned on.

First, the deterioration degree collecting section 23 determines whether or not the quality information has been received from the terminal device 13 or the relay device 30 via the communication section 21 (S100). When the quality information has been received (S100: Yes), the deterioration degree collecting section 23 stores the deterioration degree included in the quality information in the path information retaining section 24 in association with the signal ID and the relay device ID that are included in the received quality information (S101), and again executes the processing illustrated in Step S100.

On the other hand, when the quality information has not been received (S100: No), the regenerative repeater allocation section 26 determines whether or not a timing to examine the deterioration degree of the optical signal in each of the terminal devices 13 and the relay devices 30 has been reached (S102), determines whether or not a reception error including a signal ID has been notified from the terminal device 13 via the communication section 21 (S103), and determines whether or not an instruction to reallocate the regenerative repeater has been received from the administrator of the optical relay system 10 through an input device 17 (S104). The timing to examine the deterioration degree of the optical signal is, for example, every hour.

When the timing to examine the deterioration degree of the optical signal has been reached (S102: Yes), when the reception error has been notified (S103: Yes), or when the instruction to reallocate the regenerative repeater has been received (S104: Yes), the regenerative repeater allocation section 26 executes a first regenerative repeater allocation processing described later (S200), and the deterioration degree collecting section 23 again executes the processing illustrated in Step S100.

On the other hand, when the timing to examine the deterioration degree of the optical signal has not been reached (S102: No), when the reception error has not been notified (S103: No), and when the instruction to reallocate the regenerative repeater has not been received (S104: No), the path changing section 22 determines whether or not an instruction to change the relay path has been received from the administrator of the optical relay system 10 through the input device 17 (S105). When the instruction to change the relay path has not been received (S105: No), the deterioration degree collecting section 23 again executes the processing illustrated in Step S100.

When the instruction to change the relay path has been received (S105: Yes), the path changing section 22 instructs each of the subject terminal devices 13 and relay device 30 to change the relay path according to the instruction issued by the administrator of the optical relay system 10 via the communication section 21 (S106). Then, the path changing section 22 changes the relay device ID of the relay device 30 on the relay path retained within the path information retaining section 24 with regard to the optical signal to be subjected to the changing of the path (S107).

Subsequently, the path changing section 22 transmits the quality measuring instruction to each of the terminal devices 13 and the relay devices 30 via the communication section 21 (S108). Then, the deterioration degree collecting section 23 receives the quality information from the terminal device 13 or the relay device 30 via the communication section 21, and stores the deterioration degree included in the quality information in the path information retaining section 24 in association with the signal ID and the relay device ID that are included in the received quality information (S109). Then, the regenerative repeater allocation section 26 executes a second regenerative repeater allocation processing described later (S300), and the deterioration degree collecting section 23 again executes the processing illustrated in Step S100.

Figure 10:
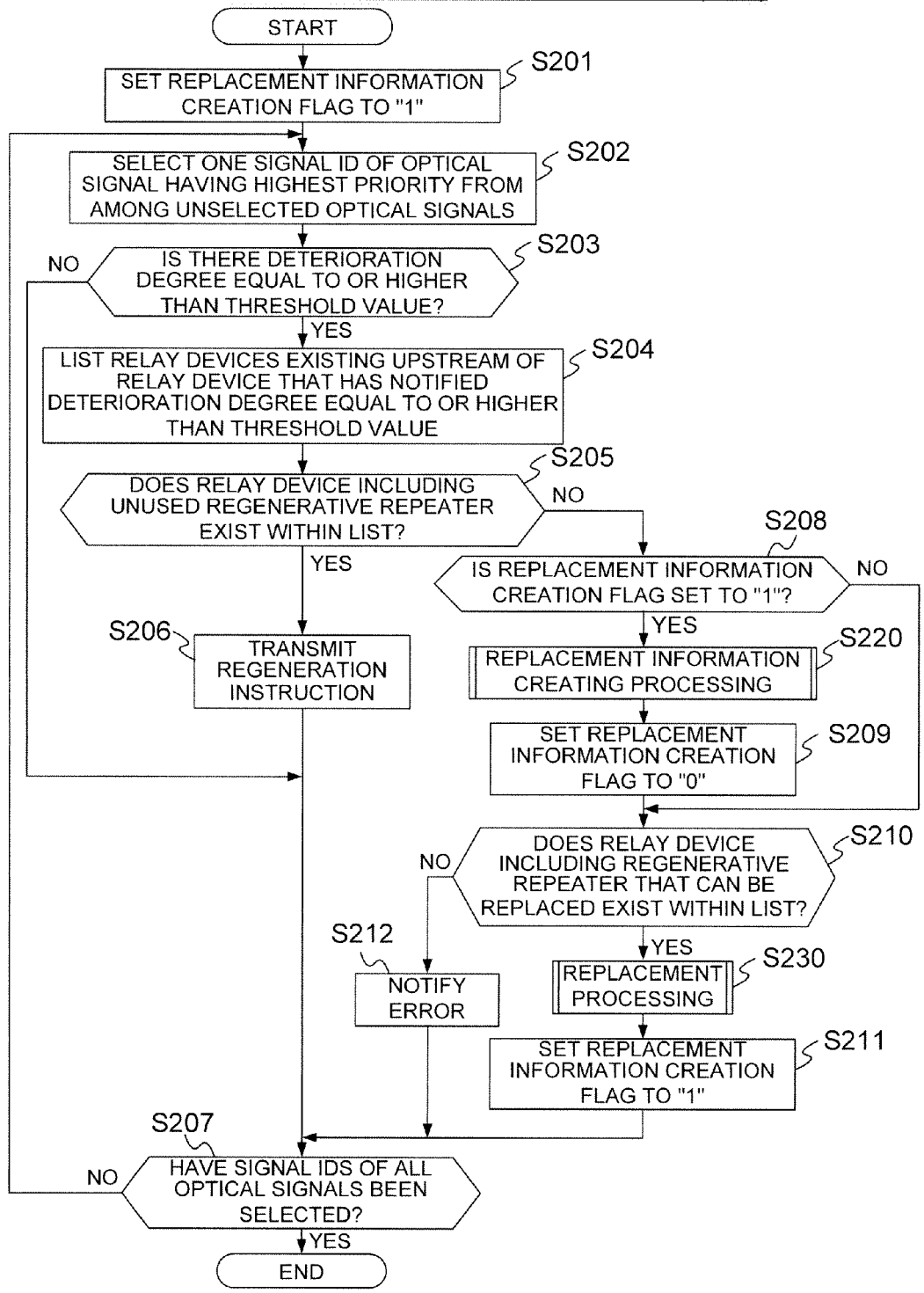
FIG. 10 is a flowchart illustrating an example of a first regenerative repeater allocation processing (S200)

FIG. 10 is a flowchart illustrating an example of the first regenerative repeater allocation processing (S200).

First, the regenerative repeater allocation section 26 sets a replacement information creation flag, which indicates that replacement information needs to be created, to "1" (S201), and references the priority retaining section 25 to select one signal ID of the optical signal having the highest priority from among the unselected optical signals (S202).

Subsequently, the regenerative repeater allocation section 26 references the path information retaining section 24 and the threshold value retaining section 29 to determine whether or not the signal ID selected in Step S202 is associated with the deterioration degree equal to or higher than the threshold value (S203). When the signal ID selected in Step S202 is not associated with the deterioration degree equal to or higher than the threshold value (S203: No), the regenerative repeater allocation section 26 executes the processing illustrated in Step S207.

On the other hand, when the signal ID selected in Step S202 is associated with the deterioration degree equal to or higher than the threshold value (S203: Yes), the regenerative repeater allocation section 26 extracts one relay device ID associated with the deterioration degree equal to or higher than the threshold value from the path information retaining section 24. It should be noted that in a case where the signal ID selected in Step S202 is associated with a plurality of deterioration degrees equal to or higher than the threshold value, the regenerative repeater allocation section 26 extracts, from the path information retaining section 24, one relay device ID of the relay device located at the most upstream on the relay path of the optical signal corresponding to the signal ID selected in Step S202 from among the relay device IDs associated with the deterioration degrees equal to or higher than the threshold value.

Subsequently, the regenerative repeater allocation section 26 references the path information retaining section 24 to create a list in which the relay device IDs of the relay devices located at an upstream of the relay device having the extracted relay device ID on the relay path of the optical signal corresponding to the signal ID selected in Step S202 are stored in association with the signal ID selected in Step S202 (S204).

Figure 11:
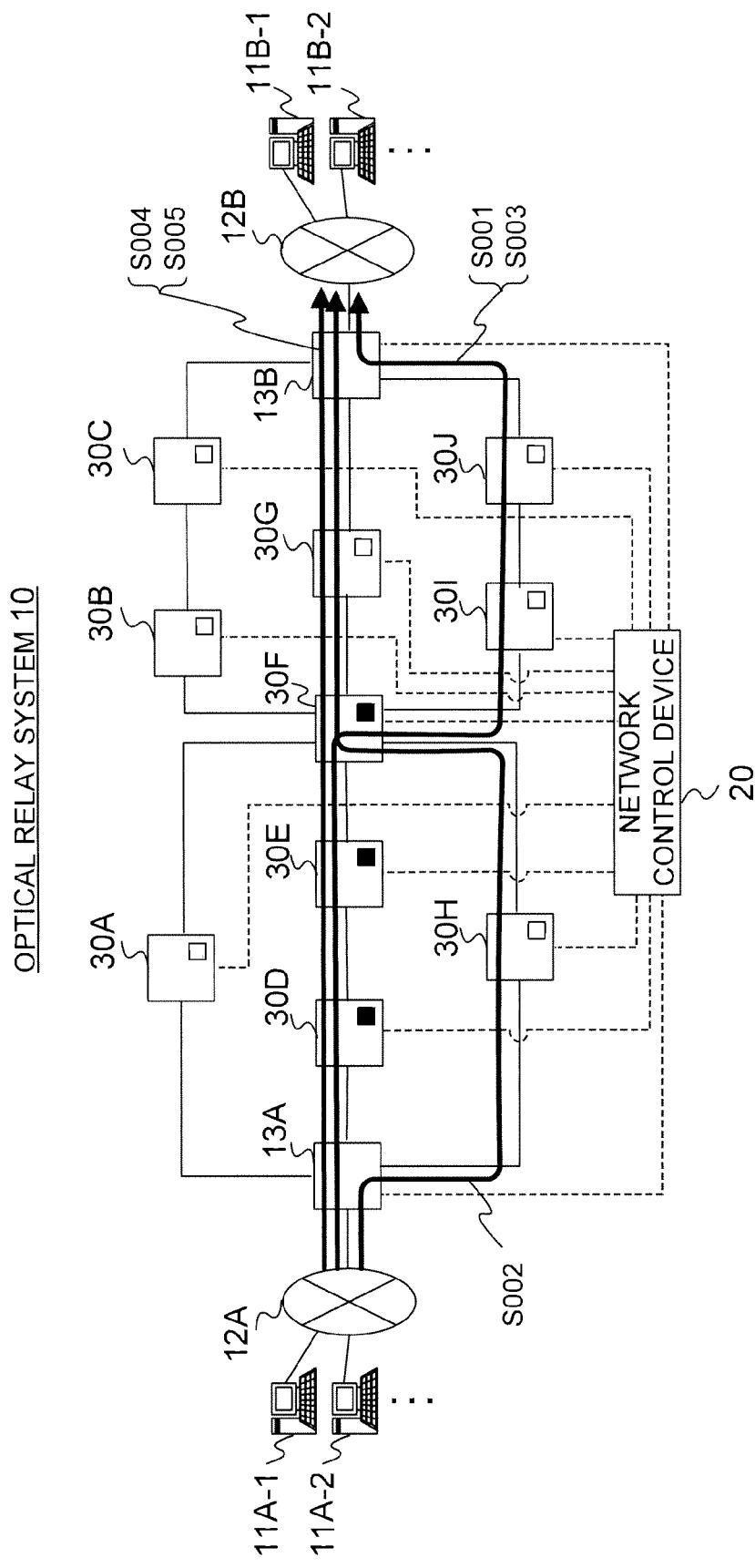
FIG. 11 is a conceptual diagram for describing a flow of the optical signal relayed within the optical relay system.
Figure 12:
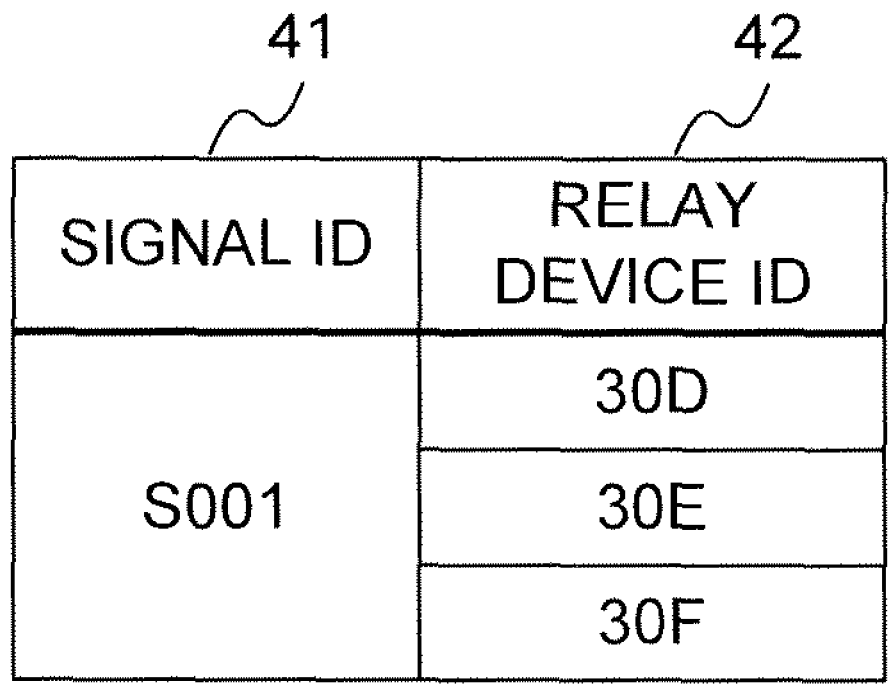
FIG. 12 is a diagram illustrating an example of a structure of data of a list created in a process of the first regenerative repeater allocation processing.

For example, as illustrated in FIG. 11, in a situation in which the optical signal of which signal ID is "S001" is being transmitted from the terminal device 13A to the terminal device 13B by being relayed via the relay device 30D, the relay device 30E, the relay device 30F, a relay device 30I, and a relay device 30J in the stated order, when the deterioration degree notified from the relay device 30I is equal to or higher than the threshold value, the regenerative repeater allocation section 26 creates a list 40 as illustrated in, for example, FIG. 12. It should be noted that in FIG. 11, a box within each of the relay devices 30 represents the regenerative repeater 35, and the black-filled box indicates that the regenerative repeater 35 is in use.

Stored in the list 40 in association with a signal ID 41 selected in Step S202 are relay device IDs 42, in other words, the relay device ID "30D" of the relay device 30D, the relay device ID "30E" of the relay device 30E, and the relay device ID "30F" of the relay device 30F that are located at the upstream of the relay device 30I on the relay path of the optical signal corresponding to the signal ID 41.

Subsequently, the regenerative repeater allocation section 26 references the equipment information retaining section 28 to determine whether or not the relay device 30 including the unused regenerative repeater 35 exists among the relay devices 30 corresponding to the relay device IDs within the list created in Step S204 (S205).

In the example of FIG. 11, the optical signal whose signal ID is "S002" is being regenerated by a regenerative repeater 35f within the relay device 30F whose relay device ID is "30F", the optical signal whose signal ID is "S004" is being regenerated by the regenerative repeater 35e within the relay device 30E whose relay device ID is "30E", and the optical signal whose signal ID is "S005" is being regenerated by a regenerative repeater 35d within the relay device 30D whose relay device ID is "30D".

The above-mentioned situation is also understood from the information within the equipment information retaining section 28 exemplified in FIG. 4. By referring to FIG. 4, it is understood that the regenerative repeaters 35 within the relay devices 30 corresponding to the relay device IDs "30D", "30E", and "30F" stored in the list 40 exemplified in FIG. 12 are all in use.

When the relay device 30 including an unused regenerative repeater 35 exists (S205: Yes), the regenerative repeater allocation section 26 transmits the regeneration instruction including the signal ID selected in Step S202 to the relay device 30 including the unused regenerative repeater 35 via the communication section 21 (S206). It should be noted that in a case where a plurality of relay devices 30 including the unused regenerative repeater 35 exist, the regenerative repeater allocation section 26 transmits the regeneration instruction including the signal ID selected in Step S202 to the relay device 30 that is located on the relay path at the upstream of the relay device 30 that has reported the deterioration degree equal to or higher than the threshold value and at the most downstream from among the relay devices 30 including the unused regenerative repeater 35 (in other words, the relay device 30 located on the relay path at the closest upstream of the relay device 30 that has reported the deterioration degree equal to or higher than the threshold value).

Subsequently, the regenerative repeater allocation section 26 determines whether or not the signal IDs of all the optical signals have been selected in Step S202 (S207). When there is an unselected signal ID (S207: No), the regenerative repeater allocation section 26 again executes the processing illustrated in Step S202. On the other hand, when the signal IDs of all the optical signals have been selected (S207: Yes), the regenerative repeater allocation section 26 ends the first regenerative repeater allocation processing illustrated in this flowchart.

When it is determined in Step S205 that the relay device ID of the relay device 30 including the unused regenerative repeater 35 does not exist in the list created in Step S204 (S205: No), the regenerative repeater allocation section 26 determine whether or not the replacement information creation flag is set to "1" (S208). When the replacement information creation flag is not set to "1" (S208: No), the regenerative repeater allocation section 26 executes the processing illustrated in Step S210.

On the other hand, when the replacement information creation flag is set to "1" (S208: Yes), the regenerative repeater allocation section 26 executes a replacement information creating processing described later (S220), and sets the replacement information creation flag to "0" (S209). When the replacement information creating processing described later is executed, the information as illustrated in, for example, FIG. 8 is stored into the replacement information retaining section 27. By referring to the replacement information retaining section 27, it is possible to identify the relay device 30 including the regenerative repeater 35 that can be replaced by another unused regenerative repeater 35 in regenerating the optical signal.

Subsequently, the regenerative repeater allocation section 26 references the replacement information retaining section 27 in which the information created in Step S220 is registered to determine whether or not the relay device 30 including the regenerative repeater 35 that can be replaced exists within the list created in Step S204 (see FIG. 12) (S210). Specifically, the regenerative repeater allocation section 26 determines whether or not anyone of the relay device IDs within the list created in Step S204 is registered as an in-use device ID within the replacement information retaining section 27 in which the information created in Step S220 is registered.

When the relay device 30 including the regenerative repeater 35 that can be replaced exists within the list created in Step S204 (S210: Yes), the regenerative repeater allocation section 26 executes a replacement processing for replacing the relay device 30 registered as the in-use device ID within the replacement information retaining section 27 by another relay device 30 corresponding to a replacement device ID associated with the in-use device ID in regenerating the optical signal (S230). Details of the replacement processing are described later. Then, the regenerative repeater allocation section 26 sets the replacement information creation flag to "1" (S211), and executes the processing illustrated in Step S207.

When the relay device 30 including the regenerative repeater 35 that can be replaced does not exist within the list created in Step S204 (S210: No), the regenerative repeater allocation section 26 displays an error to the effect that the deterioration of the signal cannot be resolved due to absence of another regenerative repeater 35 that can be allocated on a display device (not shown) or the like along with the signal ID selected in Step S202 (S212), and executes the processing illustrated in Step S207.

By the execution of the first regenerative repeater allocation processing illustrated in this flowchart, when the deterioration degree of the optical signal becomes equal to or higher than the threshold value in the relay device 30 on the relay path of each optical signal, if the relay device 30 including the unused regenerative repeater 35 exists on the relay path, the regenerative repeater allocation section 26 assigns the regenerative repeater 35 to thereby lower the deterioration degree of the optical signal.

Further, when the deterioration degree of the optical signal becomes equal to or higher than the threshold value, even when the relay device 30 including the unused regenerative repeater 35 does not exist on the relay path, as long as the regenerative repeater 35 that is in use on the relay path can be replaced by another regenerative repeater 35, the regenerative repeater allocation section 26 can lower the deterioration degree of the optical signal by assigning the regenerative repeater 35 that has become unused by the replacement.

Figure 13:
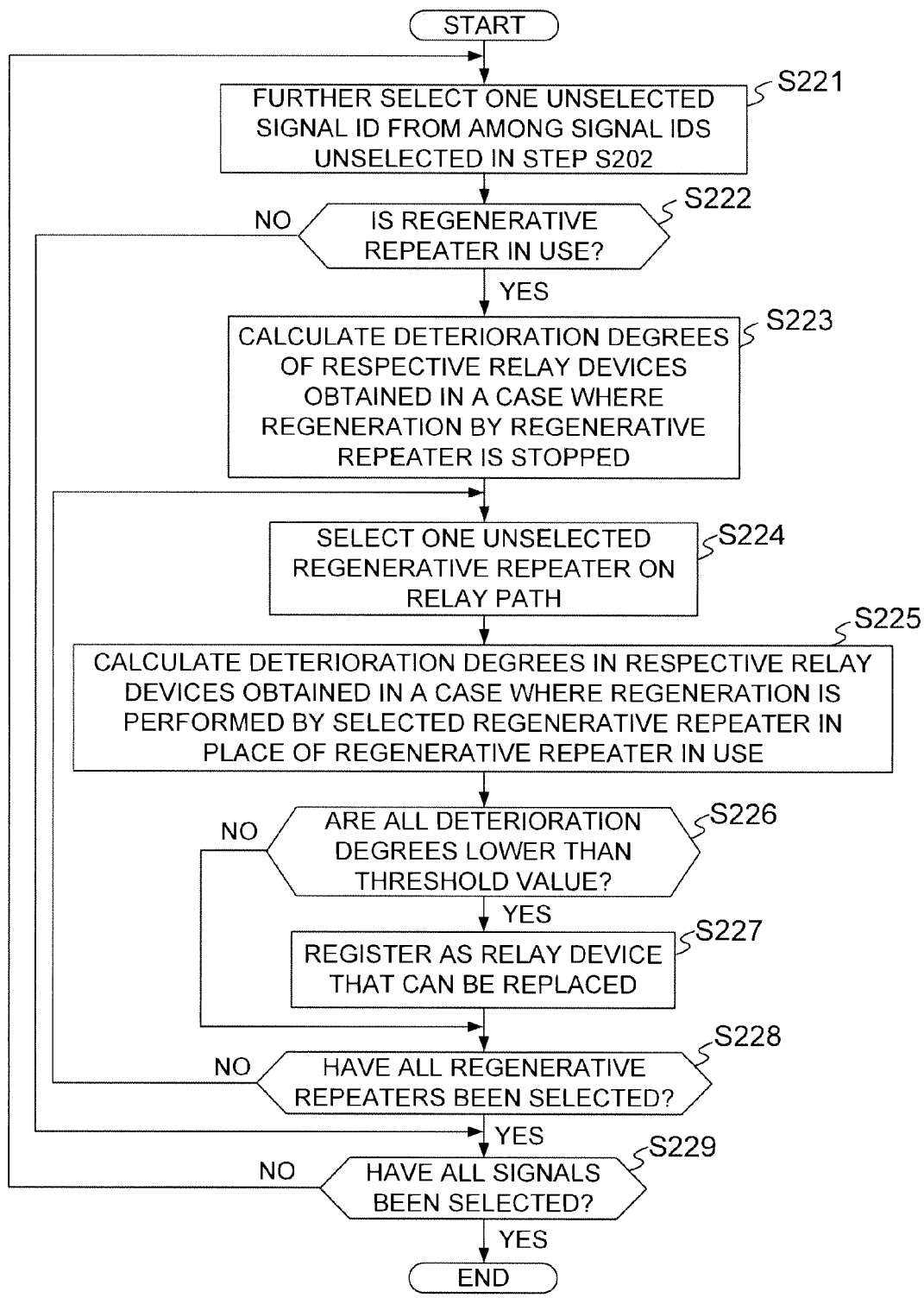
FIG. 13 is a flowchart illustrating an example of a replacement information creating processing (S220)

FIG. 13 is a flowchart illustrating an example of the replacement information creating processing (S220).

First, one unselected signal ID is further selected from among the signal IDs unselected in Step S202 (S221), and the relay device ID associated with the selected signal ID is extracted from the path information retaining section 24. Then, the regenerative repeater allocation section 26 references the equipment information retaining section 28 to determine whether or not the extracted relay device ID is associated with use information indicating that the regenerative repeater 35 is in use, to thereby determine whether or not the optical signal corresponding to the selected signal ID is being regenerated by the regenerative repeater 35 of any one of the relay devices 30 on the relay path (S222).

When the optical signal corresponding to the selected signal ID is not being regenerated by the regenerative repeater 35 of any one of the relay devices 30 on the relay path (S222: No), the regenerative repeater allocation section 26 executes the processing illustrated in Step S229.

On the other hand, when the optical signal corresponding to the selected signal ID is being regenerated by the regenerative repeater 35 of any one of the relay devices 30 on the relay path (S222: Yes), the regenerative repeater allocation section 26 calculates the deterioration degrees of the respective relay devices 30 on the relay path on the assumption that the regeneration by the regenerative repeater 35 is stopped (S223).

For example, consideration is given to a case where the deterioration degrees measured in the respective relay devices 30 on the relay path with regard to the optical signal whose signal ID is "S004" are distributed as indicated by, for example, the black circles of FIG. 6. In the example of FIG. 6, the optical signal is being regenerated by the regenerative repeater 35*e* within the relay device 30E.

First, the regenerative repeater allocation section 26 calculates a difference $\Delta d_1$ between the deterioration degree of the optical signal before the regeneration (black circle of FIG. 6) and the deterioration degree thereof after the regeneration (white circle of FIG. 6) in the relay device 30E regenerating the optical signal. It should be noted that the deterioration degree before the regeneration (black circle of FIG. 6) is a value measured by the deterioration degree measuring section 34 within the relay device 30E. Further, the deterioration degree after the regeneration, which is predefined as a regeneration capability of each regenerative repeater 35, is used as the deterioration degree after the regeneration (white circle of FIG. 6).

Figure 14:
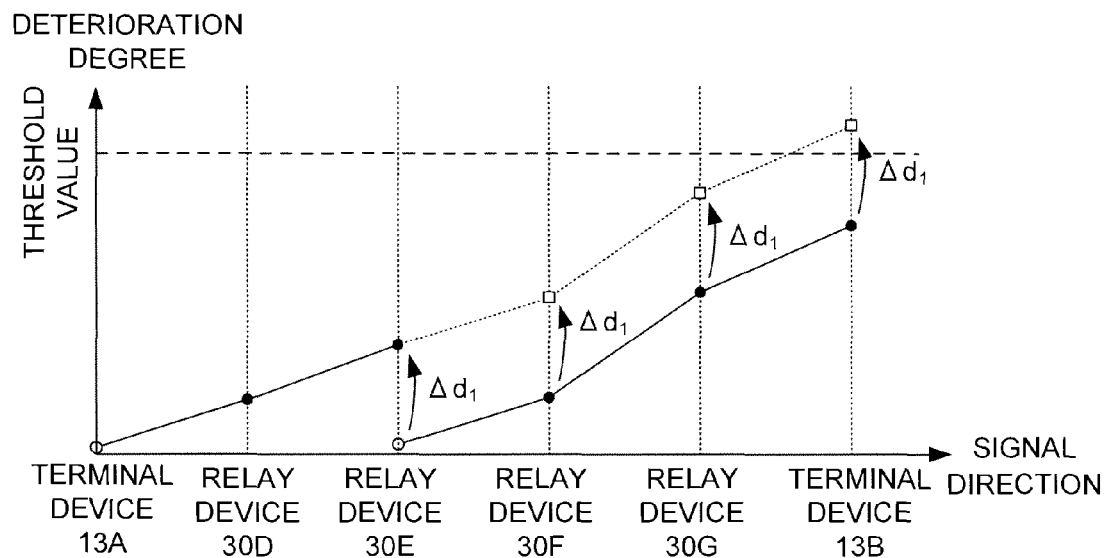
FIG. 14 is a conceptual diagram for describing a process for creating replacement information.

Then, as illustrated in, for example, FIG. 14, the regenerative repeater allocation section 26 calculates first virtual deterioration degrees (white squares of FIG. 14) by adding the calculated difference $\Delta d_1$ to the deterioration degrees measured by the relay device 30F, the relay device 30G, and the terminal device 13B that are located on the relay path at a downstream of the relay device 30E including the regenerative repeater 35*e* executing the regeneration.

Subsequently, the regenerative repeater allocation section 26 references the path information retaining section 24 and the equipment information retaining section 28 to extract the regenerative repeater IDs of the unused regenerative repeaters 35 from among the relay devices 30 on the relay path of the optical signal corresponding to the signal ID selected in Step S221. Then, the regenerative repeater allocation section 26 selects one regenerative repeater ID that is unselected from among the extracted regenerative repeater IDs (S224), and calculates the distribution of the deterioration degrees measured in the respective relay devices 30 obtained in a case where the regeneration is performed by the regenerative repeater 35 corresponding to the selected regenerative repeater ID (S225).

Figure 15:
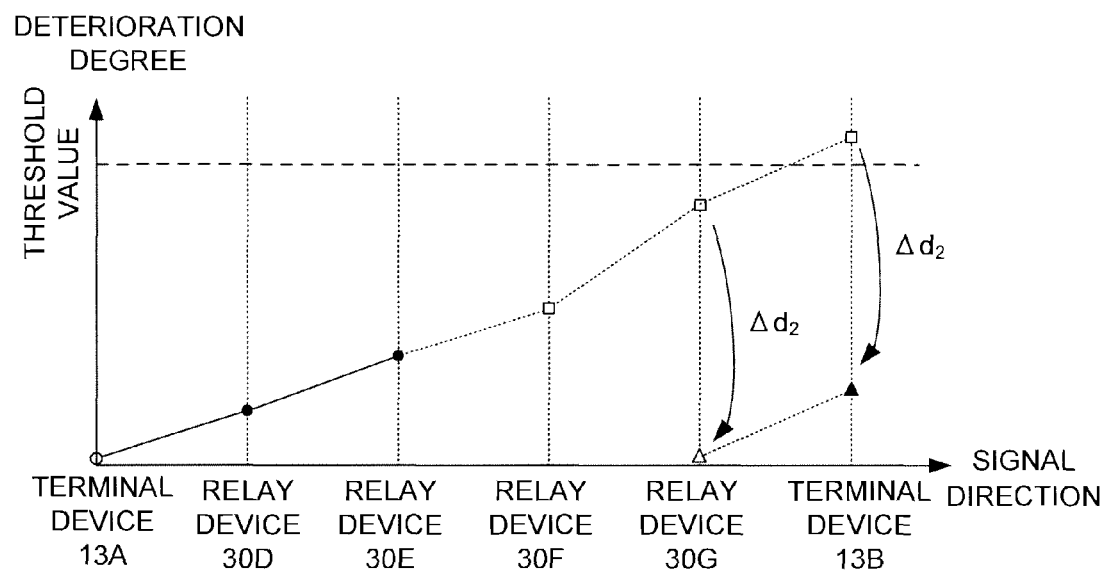
FIG. 15 is a conceptual diagram for describing the process for creating the replacement information.

For example, in the distribution of the deterioration degrees including the first virtual deterioration degrees calculated as described with reference to FIG. 14, the regenerative repeater allocation section 26 calculates a difference $\Delta d_2$ between the deterioration degrees, as illustrated in FIG. 15, obtained in a case where the regeneration is performed by the relay device 30G including an unused regenerative repeater 35*g*. Then, the regenerative repeater allocation section 26 calculates a second virtual deterioration degree by subtracting the calculated difference $\Delta d_2$ from the first virtual deterioration degree calculated with regard to the terminal device 13B located on the relay path at the downstream of the relay device 30G.

For example, in the example of FIG. 15, at a timing at which the calculation performed in Step S225 is finished, the measured deterioration degrees are employed for the relay device 30D and the relay device 30E, the first virtual deterioration degrees calculated in Step S223 are employed for the relay device 30F and the relay device 30G, and the second virtual deterioration degree calculated in Step S225 is employed for the terminal device 13B.

Subsequently, the regenerative repeater allocation section 26 determines whether or not all the deterioration degrees calculated in the respective relay devices 30 on the relay path are lower than the threshold value retained by the threshold value retaining section 29 (S226). When any one of the deterioration degrees calculated in the respective relay devices 30 on the relay path is equal to or higher than the threshold value retained by the threshold value retaining section 29 (S226: No), the regenerative repeater allocation section 26 executes the processing illustrated in Step S228.

When all the deterioration degrees calculated in the respective relay devices 30 on the relay path are lower than the threshold value retained by the threshold value retaining section 29 (S226: Yes), in other words, when the regenerative repeater 35 canoe replaced by another regenerative repeater 35, the regenerative repeater allocation section 26 stores the relay device ID of the relay device 30 including the regenerative repeater 35 assumed to be stopped in Step S223 as the in-use device ID and the relay device ID of the relay device 30 including the regenerative repeater 35 corresponding to the regenerative repeater ID being selected in Step S224 as the replacement device ID, in the replacement information retaining section 27 in association with the signal ID being selected in Step S221 (S227).

Subsequently, the regenerative repeater allocation section 26 determines whether or not all the unused regenerative repeaters 35 on the relay path have been selected in Step S224 (S228). When there is an unselected regenerative repeater 35 (S228: No), the regenerative repeater allocation section 26 again executes the processing illustrated in Step S224. On the other hand, when all the unused regenerative repeaters 35 on the relay path have been selected (S228: Yes), the regenerative repeater allocation section 26 determines whether or not all the signal IDs unselected in Step S202 have been selected (S229).

When there is an unselected signal ID among the signal IDs unselected in Step S202 (S229: No), the regenerative repeater allocation section 26 again executes the processing illustrated in Step S221. On the other hand, when all the signal IDs unselected in Step S202 have been selected (S229: Yes), the regenerative repeater allocation section 26 ends the replacement information creating processing illustrated in this flowchart.

By the execution of the replacement information creating processing illustrated in this flowchart, in the case where each optical signal is being regenerated, the information for identifying the relay device 30 including the regenerative repeater 35 that can be replaced by another unused regenerative repeater 35 in the regeneration can be created and registered in the replacement information retaining section 27.

Figure 16:
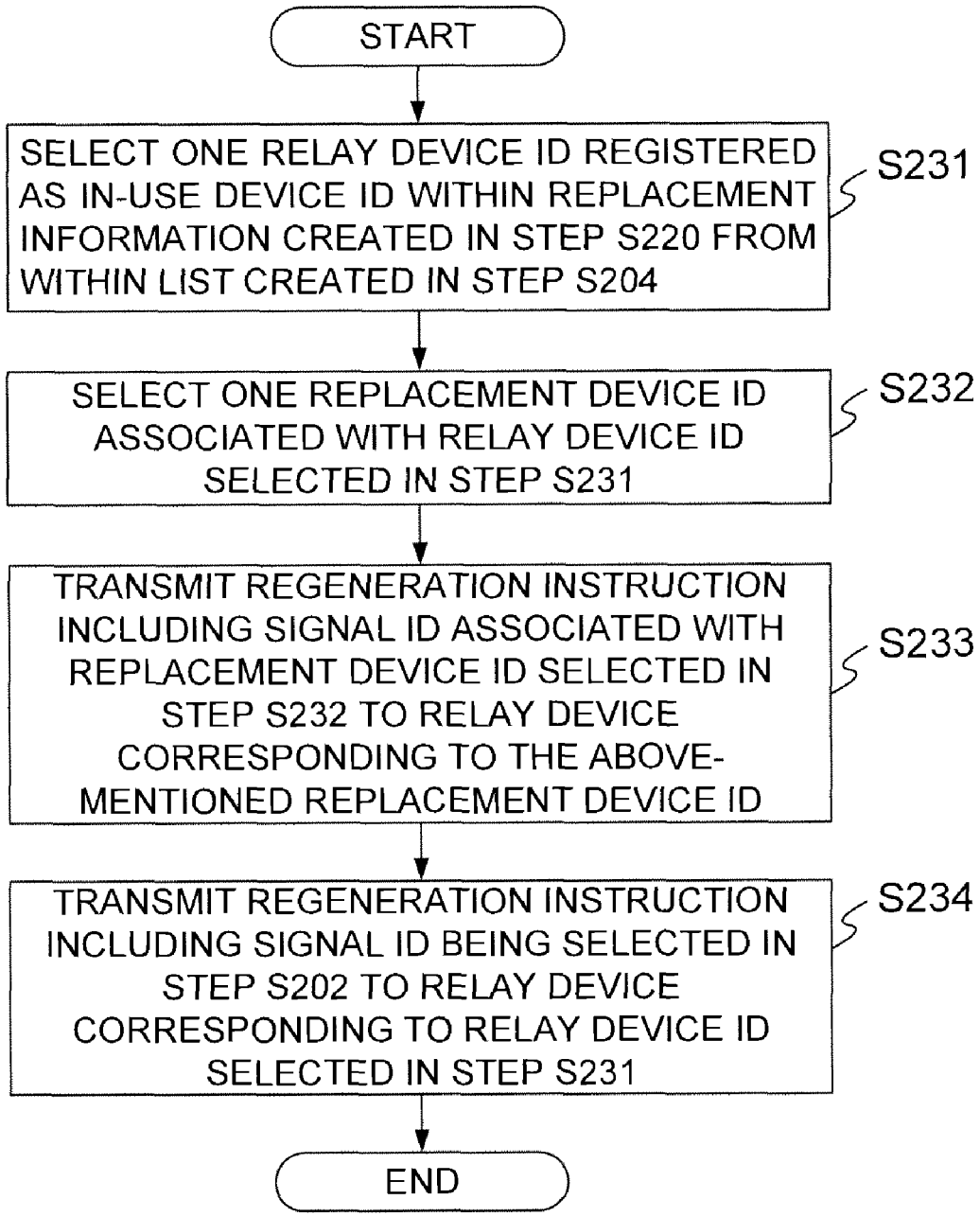
FIG. 16 is a flowchart illustrating an example of a replacement processing (S230)

FIG. 16 is a flowchart illustrating an example of the replacement processing (S230).

First, the regenerative repeater allocation section 26 selects one relay device ID registered as the in-use device ID within the replacement information retaining section 27 in which the information created in Step S220 is stored, from within the list created in Step S204 (S231).

For example, when the list as illustrated in FIG. 12 is created in Step S204, and when the information as illustrated in FIG. 8 is created in Step S220 and stored in the replacement information retaining section 27, the regenerative repeater allocation section 26 selects, for example, "30D" as the relay device ID within the list 40 which is also registered as the in-use device ID within the replacement information retaining section 27.

Subsequently, the regenerative repeater allocation section 26 references the replacement information retaining section 27 to select one replacement device ID associated with the relay device ID selected in Step S231 (S232). In the example illustrated in FIG. 8, the regenerative repeater allocation section 26 selects, for example, "30G" as the replacement device ID associated with the relay device ID selected in Step S231.

Subsequently, the regenerative repeater allocation section 26 transmits the regeneration instruction including the signal ID associated with the replacement device ID selected in Step S232 to the relay device 30 corresponding to the above-mentioned replacement device ID (S233). In the example illustrated in FIG. 8, the regenerative repeater allocation section 26 transmits the regeneration instruction including "S005" as the signal ID to the relay device 30G whose relay device ID is "30G" via the communication section 21.

Subsequently, the regenerative repeater allocation section 26 transmits the regeneration instruction including the signal ID being selected in Step S202 to the relay device 30 corresponding to the relay device ID selected in Step S231 (S234), and the regenerative repeater allocation section 26 ends the replacement processing illustrated in this flowchart. In the list 40 exemplified in FIG. 12, the relay device ID is stored in association with the signal ID being selected in Step S202, and hence the regenerative repeater allocation section 26 transmits the regeneration instruction including "S001" exemplified in FIG. 12 as the signal ID to the relay device 30 whose relay device ID is "30D" via the communication section 21.

By the execution of the replacement processing illustrated in this flowchart, even when the unused regenerative repeater 35 does not exist on the relay path, the regenerative repeater allocation section 26 can replace any one of the regenerative repeaters 35 on the relay path by another unused regenerative repeater 35 in the regeneration, and hence it is possible to secure one unused regenerative repeater 35 on the relay path.

Figure 17:
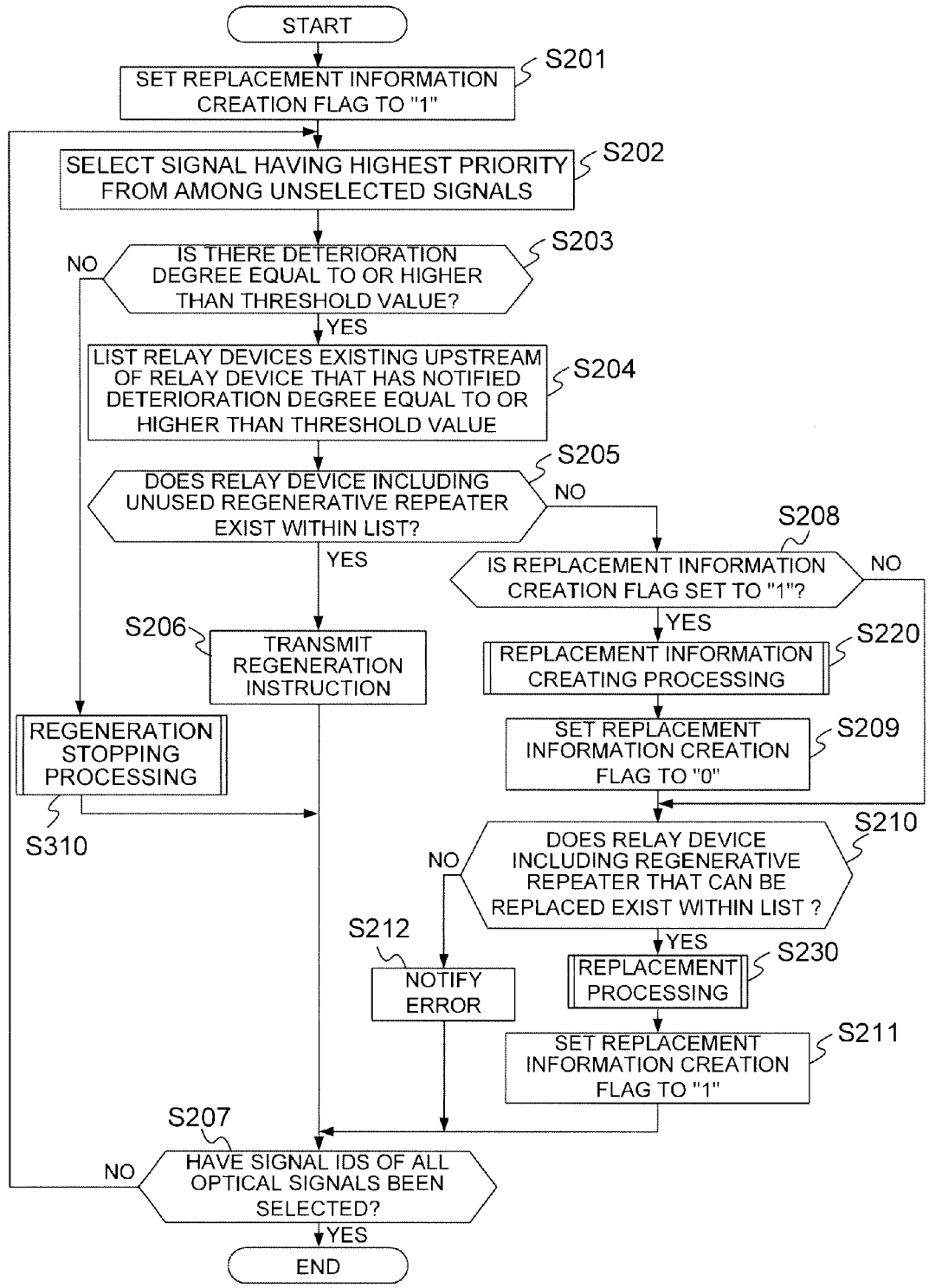
FIG. 17 is a flowchart illustrating an example of a second regenerative repeater allocation processing (S300)

Next, the second regenerative repeater allocation processing (S300) is described. FIG. 17 is a flowchart illustrating an example of the second regenerative repeater allocation processing (S300). Here, as described with reference to FIG. 9, the second regenerative repeater allocation processing (S300) is executed in the case where the relay path of the optical signal has been changed by the administrator of the optical relay system 10.

Figure 18:
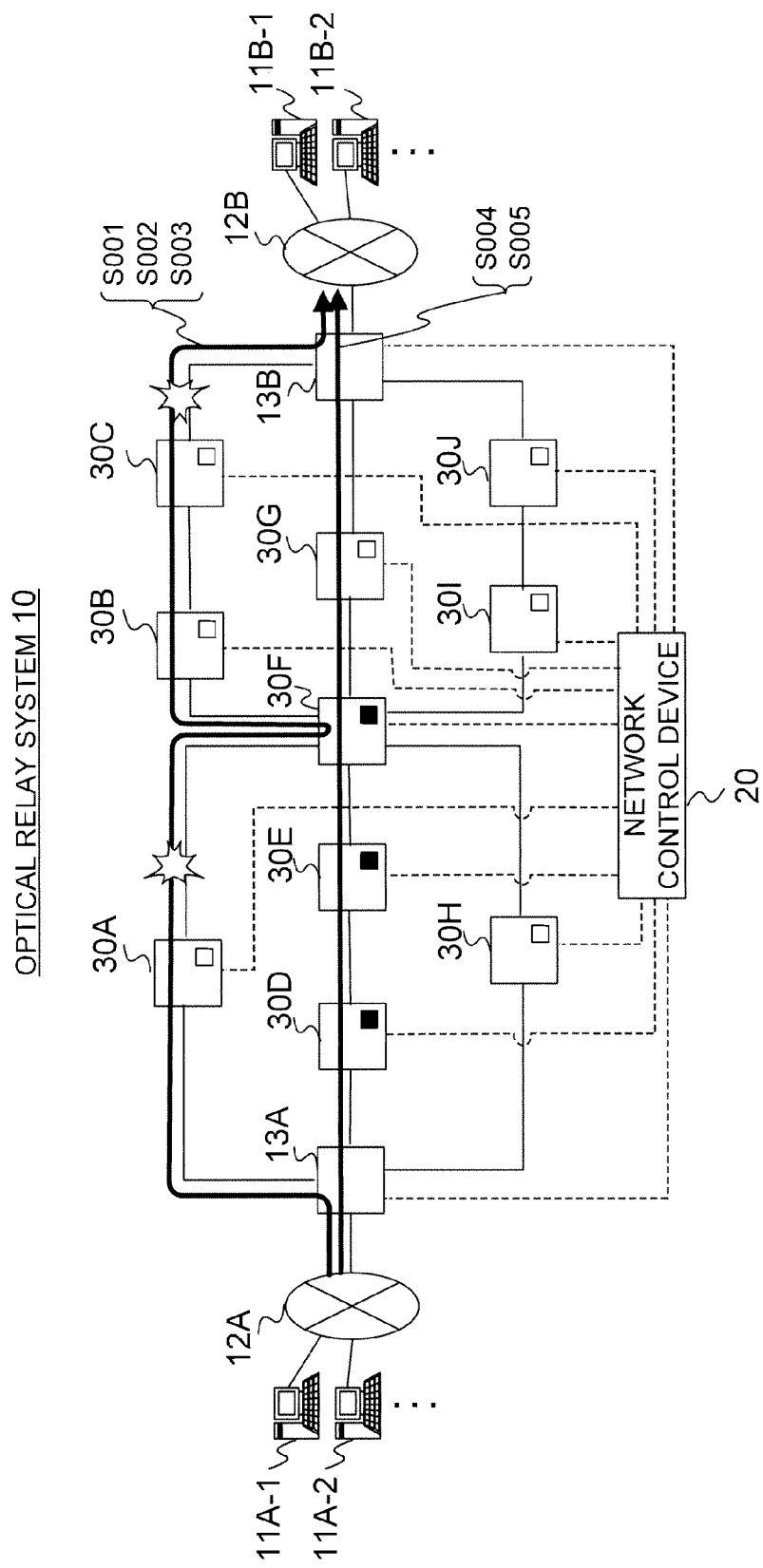
FIG. 18 is a conceptual diagram for describing the optical signal caused to flow through the optical relay system before the relay path is changed.

For example, as illustrated in FIG. 18, it is assumed that when the optical signal whose signal ID is "S001", "S002", and "S003" is being transmitted from the terminal device 13A to the terminal device 13B by being relayed via a relay device 30A, the relay device 30F, a relay device 30B, and a relay device 30C, failures have occurred in an optical line between the relay device 30A and the relay device 30F and an optical line between the relay device 30C and the terminal device 13B.

Then, it is assumed that the administrator of the optical relay system 10 has changed the relay paths of the optical signals "S001", "S002", and "S003" through the input device 17 in such a manner as illustrated in FIG. 11. It should be noted that the optical signal whose signal ID is "S002" is regenerated by the regenerative repeater 35$f$ within the relay device 30F before and after the change of the relay paths.

Further, the optical signal whose signal ID is "S004" or "S005" is being transmitted from the terminal device 13A to the terminal device 13B by being relayed via the relay device 30D, the relay device 30E, the relay device 30F, and the relay device 30G without the change of the relay path. Further, the optical signal whose signal ID is "S004" is being regenerated by the regenerative repeater 35$e$ within the relay device 30E, and the optical signal whose signal ID is "S005" is being regenerated by the regenerative repeater 35$d$ within the relay device 30D.

The description is given by returning to FIG. 17. In the second regenerative repeater allocation processing illustrated in FIG. 17, processings denoted by the same reference symbols as in the first regenerative repeater allocation processing illustrated in FIG. 10 are the same, except for the following points, as the processings described with reference to FIG. 10, and hence description thereof is omitted.

When it is determined in Step S203 of the second regenerative repeater allocation processing illustrated in FIG. 17 that the signal ID selected in Step S202 is not associated with the deterioration degree equal to or higher than the threshold value (S203: No), the regenerative repeater allocation section 26 executes a regeneration stopping processing described later (S310).

Figure 19:
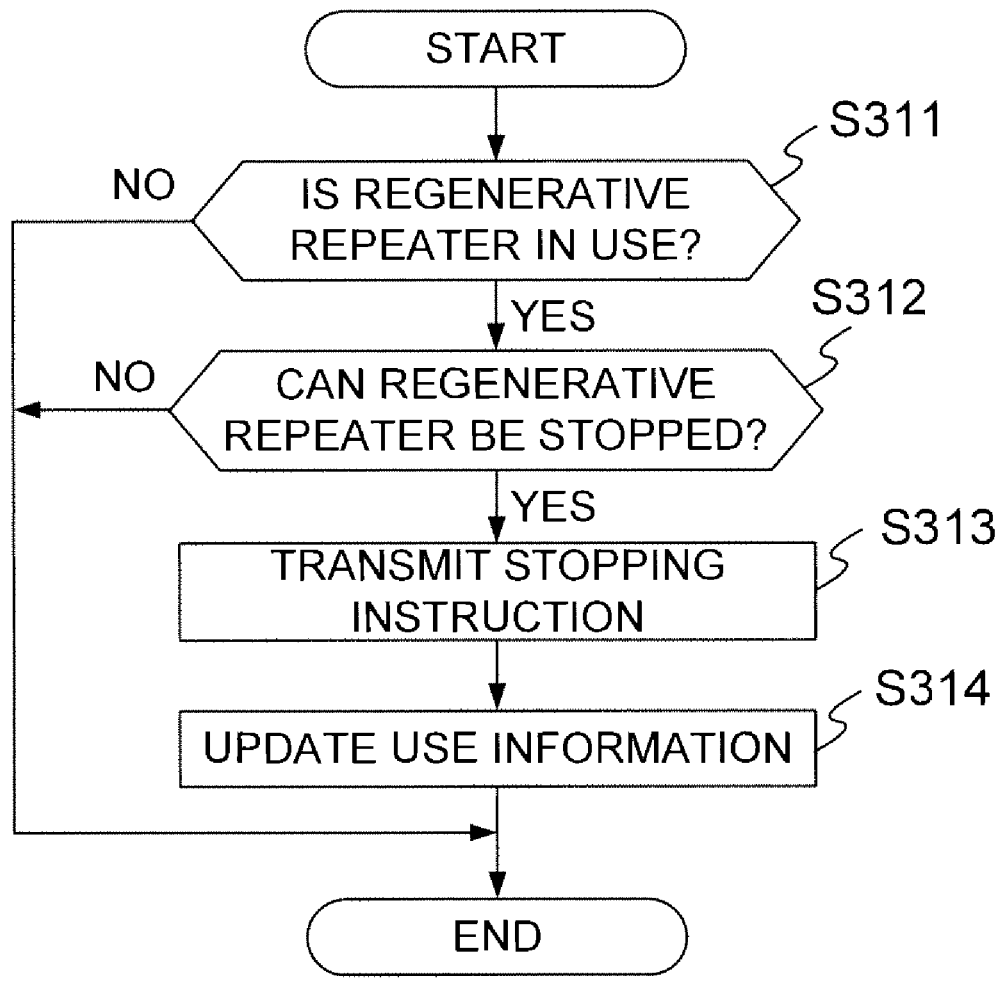
FIG. 19 is a flowchart illustrating an example of a regeneration stopping processing (S310)

FIG. 19 is a flowchart illustrating an example of the regeneration stopping processing (S310).

First, the regenerative repeater allocation section 26 references the equipment information retaining section 28 with regard to the signal ID being selected in Step S202 to determine whether or not the regenerative repeater 35 that is in use for regenerating the optical signal corresponding to the signal ID exists (S311). To give the description by taking as an example the optical signal whose signal ID is "S002" in the optical relay system 10 after the change of the relay path illustrated in FIG. 11, the optical signal is being regenerated by the regenerative repeater 35f within the relay device 30F whose relay device ID is "30F" in the optical relay system 10 after the change of the relay path.

Figure 20:
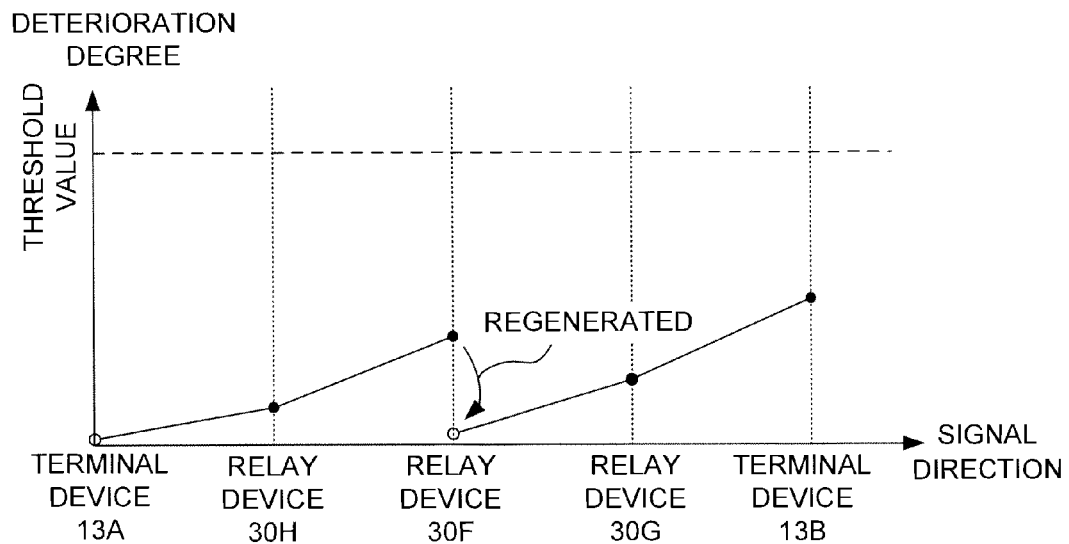
FIG. 20 is a conceptual diagram for describing a process for the regeneration stopping processing.

Subsequently, the regenerative repeater allocation section 26 references the equipment information retaining section 28 to determine whether or not the regenerative repeater 35 that is regenerating the optical signal of the signal ID being selected in Step S202 can be stopped (S312). For example, in the optical relay system 10 after the change of the relay path illustrated in FIG. 11, it is assumed that the deterioration degrees measured by the respective terminal devices 13 and relay devices 30 on the relay path of the optical signal "S002" exhibit a distribution as illustrated in, for example, FIG. 20.

The regenerative repeater allocation section 26 calculates a difference $\Delta d_3$ between the deterioration degree of the optical signal before the regeneration (black circle of FIG. 20) and the deterioration degree thereof after the regeneration (white circle of FIG. 20) in the relay device 30F regenerating the optical signal. It should be noted that the deterioration degree before the regeneration (black circle of FIG. 20) is a value measured by the deterioration degree measuring section 34 within the relay device 30F. Further, the deterioration degree after the regeneration, which is predefined as the regeneration capability of each regenerative repeater 35, is used as the deterioration degree after the regeneration (white circle of FIG. 20).

Figure 21:
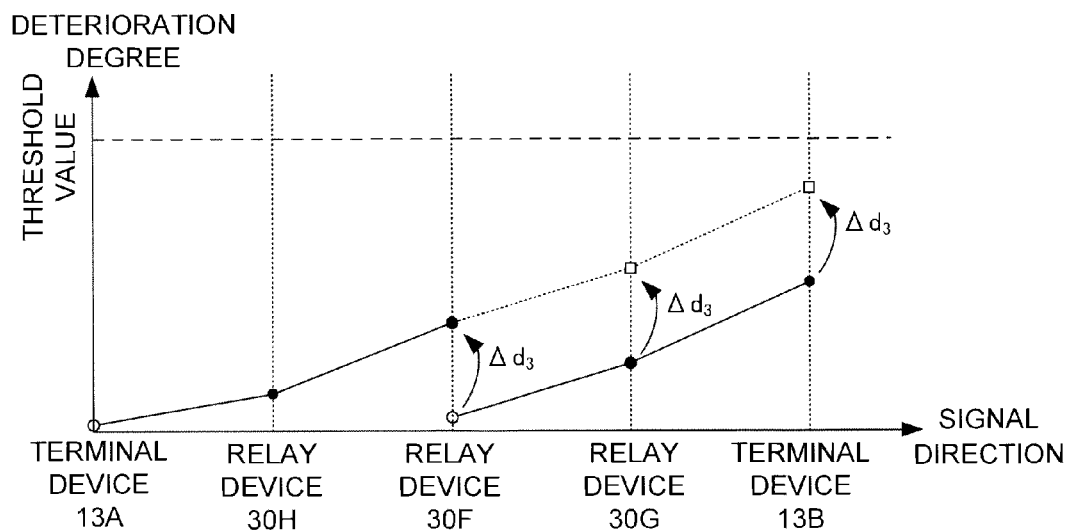
FIG. 21 is a conceptual diagram for describing the process for the regeneration stopping processing.

Then, as illustrated in, for example, FIG. 21, the regenerative repeater allocation section 26 calculates the first virtual deterioration degree (white squares of FIG. 21) on the assumption that the regeneration by the regenerative repeater 35f is stopped by adding the calculated difference $\Delta d_3$ to the deterioration degrees measured by the relay device 30G and the terminal device 13B that are located on the relay path at the downstream of the relay device 30F including the regenerative repeater 35f executing the regeneration.

Then, the regenerative repeater allocation section 26 determines whether or not all the calculated first virtual deterioration degrees are lower than the threshold value retained within the threshold value retaining section 29. When all the calculated first virtual deterioration degrees are lower than the threshold value retained within the threshold value retaining section 29, the regenerative repeater allocation section 26 determines that the regenerative repeater 35f assumed to be stopped is the regenerative repeater 35 that can be stopped.

When the regenerative repeater 35 regenerating the optical signal corresponding to the signal ID being selected in Step S202 can be stopped (S312: Yes), the regenerative repeater allocation section 26 transmits the regeneration stopping instruction including the signal ID to the relay device 30 including the regenerative repeater 35 via the communication section 21 (S313).

Subsequently, the regenerative repeater allocation section 26 modifies the use information on the regenerative repeater 35 registered in the equipment information retaining section 28 in association with the relay device ID of the relay device 30 to "unused", and deletes the signal ID associated with the regenerative repeater 35 (S314), and the regenerative repeater allocation section 26 ends the regeneration stopping processing illustrated in this flowchart.

When the regenerative repeater 35 that is in use for regenerating the optical signal corresponding to the signal ID being selected in Step S202 does not exist (S311: No), or when the regenerative repeater 35 regenerating the above-mentioned optical signal cannot be stopped (S312: No), the regenerative repeater allocation section 26 ends the regeneration stopping processing illustrated in this flowchart.

By the execution of the regeneration stopping processing, the relay path is changed to cause a change in a loss on the path, and it is possible to cancel the allocation of the regenerative repeater 35 to the optical signal whose regeneration has become unnecessary. Accordingly, wasteful power consumption of the entire optical relay system 10 can be suppressed to a low level.

Figure 22:
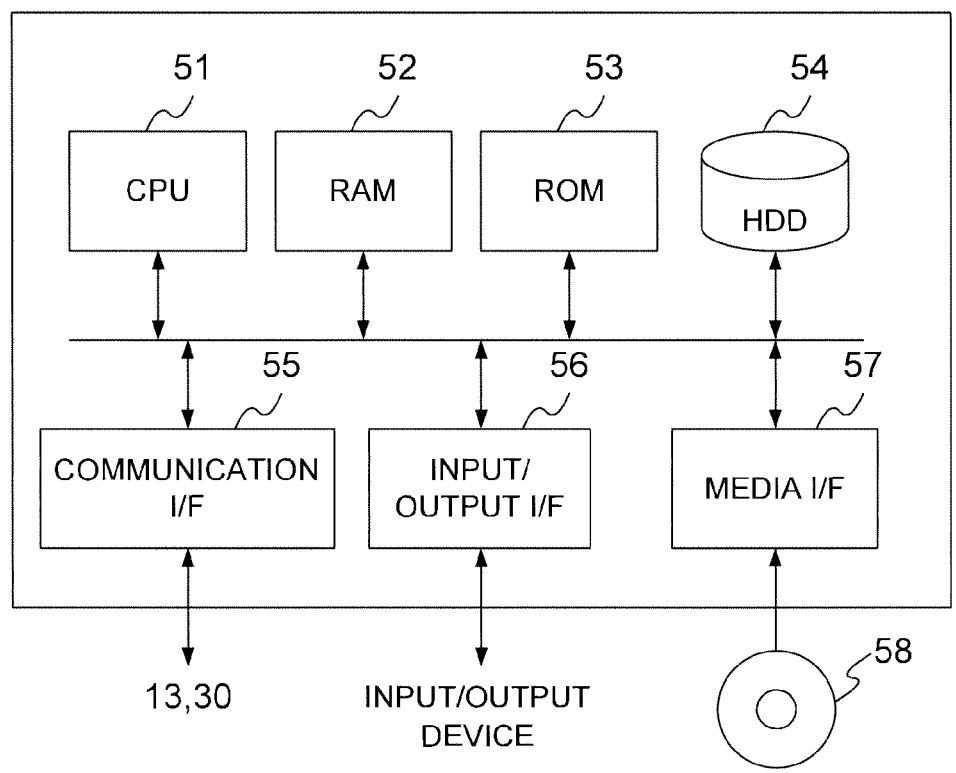
FIG. 22 is a hardware configuration diagram illustrating an example of a computer which realizes functions of the network control device.

FIG. 22 is a hardware configuration diagram illustrating an example of a computer 50 which realizes functions of the network control device 20. The computer 50 includes a central processing unit (CPU) 51, a random access memory (RAM) 52, a read only memory (ROM) 53, a hard disk drive (HDD) 54, a communication interface (I/F) 55, an input/output interface (I/F) 56, and a media interface (I/F) 57.

The CPU 51 operates based on a program stored in the ROM 53 or the HDD 54, and performs control of each component. The ROM 53 stores a boot program executed by the CPU 51 at the startup of the computer 50, a program depending on hardware of the computer 50, and the like.

The HDD 54 stores a program executed by the CPU 51, data used by the program, and the like. The communication interface 55 receives data from the terminal device 13 or the relay device 30 via the management network and sends the data to the CPU 51, while transmitting data generated by the CPU 51 to the terminal device 13 or the relay device 30 via the management network.

The CPU 51 controls an output device including a display and a printer and an input device including a keyboard and a mouse via the input/output interface 56. The CPU 51 acquires data from the input device via the input/output interface 56. Further, the CPU 51 outputs the generated data to the output device via the input/output interface 56.

The media interface 57 reads a program or data stored in a recording medium 58, and provides the program or data to the CPU 51 via the RAM 52. The CPU 51 loads the program from the recording medium 58 onto the RAM 52 via the media interface 57, and executes the loaded program. The recording medium 58 is, for example, an optical recording medium such as a digital versatile disc (DVD) or a phase change rewritable disk (PD), a magneto-optical recording medium such as a magneto-optical disk (MO), a tape medium, a magnetic recording medium, or a semiconductor memory.

The CPU 51 of the computer 50 executes the program loaded onto the RAM 52 to thereby realize the respective functions of the communication section 21, the path changing section 22, the deterioration degree collecting section 23, and the regenerative repeater allocation section 26. Stored in the ROM 53 or the HDD 54 are data items included within the path information retaining section 24, the priority retaining section 25, the replacement information retaining section 27, the equipment information retaining section 28, and the threshold value retaining section 29.

The CPU 51 of the computer 50 executes those programs by reading the programs from the recording medium 58, but as another example, the CPU 51 may acquire those programs from another device via a communication line.

The embodiment of the present invention has been described above.

As apparent from the above description, according to the optical relay system 10 of this embodiment, when the optical signal needs to be regenerated, the operation of the regenerative repeater 35 allows the wasteful power consumption of the entire system to be suppressed to a low level.

It should be noted that the present invention is not limited to the above-mentioned embodiment, and various modifications can be made within the scope of the gist.

For example, in the above-mentioned embodiment, one regenerative repeater 35 is provided within each of the relay devices 30, but the present invention is not limited thereto, and two or more regenerative repeaters 35 may be provided within each of the relay devices 30. It should be noted that, also in this case, the regeneration of the optical signal that needs to be regenerated can be realized by the plurality of relay devices 30 on the relay path, and hence the number of the regenerative repeaters 35 within each of the relay devices 30 can be further reduced than in the conventional technology (for example, the number of the regenerative repeaters 35 within each of the relay devices 30 is set to be smaller than the number of all the signals)

Further, any system is applicable as long as the regeneration of the optical signal that needs to be generated within any one of the relay devices 30 on the relay path can be realized by the regenerative repeater 35, and hence any system is applicable as long as the regenerative repeater 35 is provided within any one of the relay devices 30 on the relay path of the optical signal that needs to be regenerated even when the relay device 30 that does not include the regenerative repeater 35 exists on the relay path.

What is claimed is:

1. An optical relay system, which relays an optical signal by wavelength division multiplexing, comprising:
    a plurality of relay devices each of which relays the optical signal; and
    a network control device which controls each of the plurality of relay devices,
        each of the plurality of relay devices comprising:
            a wavelength selective switch;
            a deterioration degree measuring section which measures a deterioration degree of the optical signal having each wavelength and notifies the network control device of the measured deterioration degree along with a signal ID which identifies the corresponding optical signal and a relay device ID which identifies the own relay device; and
            a regenerative repeater which regenerates the optical signal corresponding to the signal ID when a regeneration instruction comprising the signal ID is received from the network control device,
        the network control device comprising:
            an equipment information retaining section which retains, for each of relay device IDs, a regenerative repeater ID which identifies the regenerative repeater included in the relay device corresponding to the each of the relay device IDs and use information which indicates whether or not the regenerative repeater is in use;
            a relay path retaining section which retains, for each of signal IDs, information which identifies an order in which the optical signal is relayed by a plurality of the relay devices existing on a relay path of the optical signal corresponding to the each of the signal IDs and the relay device IDs of the plurality of the relay devices existing on the relay path of the optical signal;
            a threshold value retaining section which retains a threshold value of the deterioration degree which is allowed for the optical signal having the each wavelength;
            a deterioration degree retaining section which retains, for each of the signal IDs, the deterioration degree notified with regard to the optical signal corresponding to the each of the signal IDs, in association with the relay device ID of the relay device that has notified the deterioration degree;
            a deterioration degree collecting section which stores the deterioration degree notified from each of the plurality of relay devices in the deterioration degree retaining section in association with the signal ID and the relay device ID which have been notified along with the deterioration degree; and
            a regenerative repeater allocation management section which executes a regenerative repeater allocation processing for each of the signal IDs,
        wherein the regenerative repeater allocation management section is configured to, in the regenerative repeater allocation processing:
            reference the deterioration degree retaining section and the threshold value retaining section, for each of the signal IDs, to extract the relay device ID associated with the deterioration degree equal to or higher than the threshold value from the deterioration degree retaining section when the relay device that has notified the deterioration degree equal to or higher than the threshold value exists;
            identify the relay device IDs of the relay devices existing at an upstream of the relay device having the extracted relay device ID on the relay path of the optical signal corresponding to the each of the signal IDs from within the relay path retaining section;
            select the relay device ID of the relay device comprising an unused regenerative repeater among the identified relay device IDs from within the equipment information retaining section; and
            transmit, to the relay device corresponding to the selected relay device ID, the regeneration instruction comprising the signal ID of the optical signal having the deterioration degree notified as being equal to or higher than the threshold value.

2. An optical relay system according to claim 1, wherein the regenerative repeater allocation management section is further configured to, in the regenerative repeater allocation processing, identify, for each of the signal IDs, when a plurality of the relay devices comprising the unused regenerative repeater exist among the relay devices existing at the upstream of the relay device that has notified the deterioration degree equal to or higher than the threshold value on the relay path of the optical signal corresponding to the each of the signal IDs, the relay device ID of the relay device existing at the most downstream on the relay path of the optical signal corresponding to the each of the signal IDs among the plurality of the relay devices comprising the unused regenerative repeater from within the relay path retaining section.

3. An optical relay system according to claim 2, wherein:
    the equipment information retaining section further retains, for each of the relay device IDs, the signal ID of the optical signal being regenerated by the regenerative repeater when the regenerative repeater included in the relay device corresponding to the each of the relay device IDs is in use;
    the regenerative repeater allocation management section is further configured to execute, for each of the signal IDs, a regeneration stopping processing for calculating, when the regenerative repeater that is regenerating the optical signal exists on the relay path of the optical signal corresponding to the each of the signal IDs, the deterioration degrees of the optical signal obtained by the respective relay devices in a case where regeneration of the optical signal by the regenerative repeater is stopped, as first virtual deterioration degrees, and transmitting a regeneration stopping instruction comprising the signal ID to the relay device comprising the regenerative repeater that is regenerating the optical signal when all the calculated first virtual deterioration degrees are lower than the threshold value; and the regenerative repeater within each of the relay devices is configured to stop the regeneration of the optical signal corresponding to the signal ID included in the regeneration stopping instruction when the regeneration stopping instruction is received from the network control device.

4. An optical relay system according to claim 3, wherein the regenerative repeater allocation management section is further configured to, in the regeneration stopping processing:

extract, for each of the signal IDs, the relay device ID of the relay device comprising the regenerative repeater that is regenerating the optical signal corresponding to the each of the signal IDs from the equipment information retaining section;

identify the relay device IDs of the respective relay devices existing at a downstream of the relay device corresponding to the extracted relay device ID on the relay path of the optical signal corresponding to the each of the signal IDs from within the relay path retaining section;

identify the deterioration degree of the optical signal, which has been notified from the relay device corresponding to the extracted relay device ID, from within the deterioration degree retaining section, and calculate a difference between the deterioration degree of the optical signal before regeneration thereof and the deterioration degree of the optical signal after the regeneration based on the identified deterioration degree;

calculate the first virtual deterioration degrees in the respective relay devices on the relay path of the optical signal corresponding to the each of the signal IDs by referencing the deterioration degree retaining section to add the calculated difference between the deterioration degrees to the deterioration degree notified from each of the respective relay devices existing at the downstream; and change the use information stored in the equipment information retaining section in association with the extracted relay device ID and the each of the signal IDs to "unused" when all the calculated first virtual deterioration degrees are lower than the threshold value retained by the threshold value retaining section, and transmit the regeneration stopping instruction comprising the each of the signal IDs to the relay device corresponding to the extracted relay device ID.

5. An optical relay system according to claim 4, wherein the regenerative repeater allocation management section is further configured to execute the regeneration stopping processing when there is a change in the relay path of the optical signal.

6. An optical relay system according to claim 5, wherein:

the network control device further comprises a replacement information retaining section which retains, for each of the signal IDs, an in-use device ID which indicates the relay device ID of the relay device comprising the regenerative repeater that is regenerating the optical signal corresponding to the each of the signal IDs and a replacement device ID which indicates the relay device ID of the relay device comprising another regenerative repeater that can replace the regenerative repeater in regenerating the optical signal corresponding to the each of the signal IDs; and the regenerative repeater allocation management section is further configured to:

execute, for each of the signal IDs, a replacement information creating processing for determining, when the relay device comprising the regenerative repeater that is regenerating the optical signal corresponding to the each of the signal IDs exists on the relay path of the optical signal, whether or not the regenerative repeater can be replaced by another unused regenerative repeater in regenerating the optical signal, and when the another unused regenerative repeater that can replace the regenerative repeater exists, storing the relay device ID of the relay device comprising the another unused regenerative repeater that can replace the regenerative repeater as the replacement device ID and the relay device ID of the relay device comprising the regenerative repeater to be replaced as the in-use device ID, in the replacement information retaining section in association with the each of the signal IDs; and in the regenerative repeater allocation processing, retrieve, for each of the signal IDs, when the regenerative repeaters within all the relay devices existing at the upstream of the relay device that has notified the deterioration degree are in use, another regenerative repeater that can replace any one of the regenerative repeaters that are in use in regenerating the optical signal with reference to the replacement information retaining section that has information registered in the replacement information creating processing, transmit the regeneration instruction comprising the signal ID of the optical signal that is being regenerated by the regenerative repeater to be replaced to the another relay device that has been retrieved, set the regenerative repeater within the relay device to an unused state by transmitting the regeneration stopping instruction comprising the signal ID of the optical signal that is being regenerated by the regenerative repeater to the relay device comprising the regenerative repeater to be replaced, and transmit the regeneration instruction comprising the signal ID of the optical signal, which has the deterioration degree exceeding the threshold value, to the relay device comprising the regenerative repeater that has been changed to the unused state.

7. An optical relay system according to claim 6, wherein the regenerative repeater allocation management section is further configured to, in the replacement information creating processing:

extract, for each of the signal IDs, the relay device ID of the relay device comprising the regenerative repeater that is regenerating the optical signal corresponding to the each of the signal IDs from the equipment information retaining section;

identify the relay device IDs of the respective relay devices existing at the downstream of the relay device corresponding to the extracted relay device ID on the relay path of the optical signal corresponding to the each of the signal IDs from within the relay path retaining section;

identify the deterioration degree of the optical signal, which has been notified from the relay device corresponding to the extracted relay device ID, from within the deterioration degree retaining section, and calculate a difference between the deterioration degree of the optical signal before the regeneration and the deterioration degree of the optical signal after the regeneration based on the identified deterioration degree;

calculate the first virtual deterioration degrees in the respective relay devices on the relay path of the optical signal corresponding to the each of the signal IDs by referencing the deterioration degree retaining section to add the calculated difference between the deterioration degrees to the deterioration degree notified from each of the respective relay devices existing at the downstream;

use the deterioration degrees notified from the respective relay devices existing at the upstream of the relay device corresponding to the extracted relay device ID on the relay path of the optical signal corresponding to the each of the signal IDs and the first virtual deterioration degrees calculated for the respective relay devices existing at the downstream, to calculate, as second virtual deterioration degrees, the deterioration degrees measured by the respective relay devices on the relay path of the optical signal corresponding to the each of the signal IDs for a case of using each of unused regenerative repeaters within the relay devices that are other than the relay device corresponding to the extracted relay device ID and exist on the relay path of the optical signal corresponding to the each of the signal IDs; and store, when all the calculated second virtual deterioration degrees are lower than the threshold value, the relay device IDs of the relay devices comprising the regenerative repeaters used in a process of calculating the second virtual deterioration degrees as the replacement device IDs and the extracted relay device ID as the in-use device ID, in the replacement information retaining section in association with each targeted signal ID.

8. An optical relay system according to claim 1, wherein:
the network control device further comprises a priority retaining section which retains, for each of the signal IDs, a priority of the optical signal corresponding to the each of the signal IDs; and the regenerative repeater allocation management section is further configured to reference the priority retaining section to execute the regenerative repeater allocation processing for each of the signal IDs of respective optical signals in descending order of the priority.

9. A network control device, which controls respective relay devices in an optical relay system comprising a plurality of relay devices each of which relays an optical signal, the network control device comprising:

an equipment information retaining section which retains, for each of relay device IDs which identify the respective relay devices, a regenerative repeater ID which identifies a regenerative repeater included in the relay device corresponding to the each of the relay device IDs and use information which indicates whether or not the regenerative repeater is in use;

a relay path retaining section which retains, for each of signal IDs which identify optical signals having respective wavelengths, information which identifies an order in which the optical signal is relayed by a plurality of the relay devices existing on a relay path of the optical signal corresponding to the each of the signal IDs and the relay device IDs of the plurality of the relay devices existing on the relay path of the optical signal;

a threshold value retaining section which retains a threshold value of a deterioration degree which is allowed for each of the optical signals having the respective wavelength;

a deterioration degree retaining section which retains, for each of the signal IDs, the deterioration degree notified with regard to the optical signal corresponding to the each of the signal IDs, in association with the relay device ID of the relay device that has notified the deterioration degree;

a deterioration degree collecting section which stores the deterioration degree notified from each of the plurality of relay devices in the deterioration degree retaining section in association with the signal ID and the relay device ID which have been notified along with the deterioration degree; and a regenerative repeater allocation management section which executes a regenerative repeater allocation processing for each of the signal IDs, wherein the regenerative repeater allocation management section is configured to, in the regenerative repeater allocation processing:

reference the deterioration degree retaining section and the threshold value retaining section, for each of the signal IDs, to extract the relay device ID associated with the deterioration degree equal to or higher than the threshold value from the deterioration degree retaining section when the relay device that has notified the deterioration degree equal to or higher than the threshold value exists;

identify the relay device IDs of the relay devices existing at an upstream of the relay device having the extracted relay device ID on the relay path of the optical signal corresponding to the each of the signal IDs from within the relay path retaining section;

select the relay device ID of the relay device comprising an unused regenerative repeater among the identified relay device IDs from within the equipment information retaining section; and transmit, to the relay device corresponding to the selected relay device ID, a regeneration instruction comprising the signal ID of the optical signal having the deterioration degree notified as being equal to or higher than the threshold value.

* * * * *